(12) United States Patent
Wakid

(10) Patent No.: US 11,558,416 B2
(45) Date of Patent: *Jan. 17, 2023

(54) BROKERED COMMUNICATION PROTOCOL USING INFORMATION THEORETIC CODING FOR SECURITY

(71) Applicant: Verizon Patent and Licensing Inc., Basking Ridge, VA (US)

(72) Inventor: Shukri Wakid, North Potomac, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 71 days.

This patent is subject to a terminal disclaimer.

(21) Appl. No.: 17/313,065

(22) Filed: May 6, 2021

(65) Prior Publication Data

US 2021/0258338 A1 Aug. 19, 2021

Related U.S. Application Data

(63) Continuation of application No. 16/717,034, filed on Dec. 17, 2019, now Pat. No. 11,025,662, which is a
(Continued)

(51) Int. Cl.
*H04L 29/00* (2006.01)
*H04L 9/40* (2022.01)
(Continued)

(52) U.S. Cl.
CPC .......... *H04L 63/1433* (2013.01); *H04L 1/203* (2013.01); *H04L 9/0819* (2013.01);
(Continued)

(58) Field of Classification Search
CPC ... H04L 63/1433; H04L 1/203; H04L 9/0819; H04L 9/14; H04L 9/304; H04L 9/3242;
(Continued)

(56) References Cited

U.S. PATENT DOCUMENTS 6,718,493 B1 4/2004 Mitlin et al.
9,055,139 B1 6/2015 Devireddy et al.
(Continued)

OTHER PUBLICATIONS

Aladev, "Testing the MQTT Messaging Broker for IoT-A Guide", 9 pages. Web: https://www.blazemeter.com/blog/testing-the-mqtt-messaging-broker-for-iot-a-guide/. Published: Jul. 25, 2017. (Year: 2017).

(Continued)

*Primary Examiner* — Don G Zhao

(57) ABSTRACT

A communication brokering device receives, from a first device, a measurement of at least one of a bit-error-rate (BER) or a signal-to-noise ratio (SNR) associated with receipt of a transmission at the first device. The communication brokering device determines whether the first device is vulnerable to message interception or eavesdropping based on the measurement of the at least one of the BER or the SNR. The communication brokering device controls communications between at least one second device and the first device based on the determination of whether the first device is vulnerable to message interception or eavesdropping.

20 Claims, 17 Drawing Sheets

Related U.S. Application Data continuation of application No. 15/795,438, filed on Oct. 27, 2017, now Pat. No. 10,547,632.

(51) Int. Cl.
  *H04L 1/20* (2006.01)
  *H04L 9/14* (2006.01)
  *H04L 9/30* (2006.01)
  *H04L 9/32* (2006.01)
  *H04L 9/08* (2006.01)

(52) U.S. Cl.
  CPC ............... *H04L 9/14* (2013.01); *H04L 9/304* (2013.01); *H04L 9/3242* (2013.01); *H04L 63/10* (2013.01); *H04L 63/1475* (2013.01)

(58) Field of Classification Search
  CPC . H04L 63/10; H04L 63/1475; H04L 63/1425; H04L 63/1458; H04W 12/033; H04W 12/009; H04W 84/18
  See application file for complete search history.

(56) References Cited

U.S. PATENT DOCUMENTS

| | | | |
|---|---|---|---|
| 9,213,850 | B2 | 12/2015 | Barton et al. |
| 9,386,120 | B2 | 7/2016 | Borzycki et al. |
| 10,355,853 | B1 | 7/2019 | Surmi et al. |
| 10,502,572 | B1 | 12/2019 | Surmi et al. |
| 11,025,662 | B2 * | 6/2021 | Wakid ................ H04L 63/1475 |
| 2004/0058652 | A1 | 3/2004 | McGregor et al. |
| 2007/0121596 | A1 | 5/2007 | Kurapati et al. |
| 2009/0193131 | A1 | 7/2009 | Shi |
| 2010/0020717 | A1 | 1/2010 | McGregor et al. |
| 2012/0284506 | A1 | 11/2012 | Kravitz et al. |
| 2012/0323997 | A1 | 12/2012 | Mezhibovsky et al. |
| 2013/0145212 | A1 | 6/2013 | Hsu et al. |
| 2013/0212646 | A1 | 8/2013 | McFarland et al. |
| 2016/0028753 | A1 * | 1/2016 | Di Pietro ............ H04L 63/1458 726/23 |
| 2016/0043832 | A1 * | 2/2016 | Ahn ........................ H04L 1/08 714/704 |
| 2016/0112438 | A1 | 4/2016 | Hengstler et al. |
| 2016/0210649 | A1 | 7/2016 | Buckholdt et al. |
| 2016/0219024 | A1 | 7/2016 | Verzun et al. |
| 2016/0255066 | A1 | 9/2016 | Green et al. |
| 2017/0331623 | A1 * | 11/2017 | Fu ........................ H04B 10/85 |
| 2017/0337397 | A1 | 11/2017 | Tang |
| 2018/0218145 | A1 | 8/2018 | Hussain et al. |
| 2018/0270310 | A1 | 9/2018 | Venkatesan et al. |
| 2018/0336548 | A1 | 11/2018 | Crosby et al. |
| 2018/0359811 | A1 | 12/2018 | Verzun et al. |
| 2019/0026828 | A1 | 1/2019 | Preston et al. |
| 2019/0036906 | A1 | 1/2019 | Biyani et al. |
| 2020/0067861 | A1 * | 2/2020 | Leddy ................ G06F 21/6245 |
| 2022/0109515 | A1 * | 4/2022 | Chervyakov ........ H04B 17/345 |

OTHER PUBLICATIONS

Pardo-Castellote, "Analysis of the Advanced Message Queuing Protocol (AMQP) and comparison with the Real-Time Publish Subscribe Protocol (DDS-RTPS Interoperability Protocol)", Web publication: www.omg.org/news/meetings/workshops/RT-2007/04-3_Pardo-Castellote-revised.pdf. 36 pages. Jul. 2007 (Year: 2007).

Sarmento, et al., "Interleaved Coding for Secrecy with a Hidden Key", Dec. 6-10, 2015, published in Globecom Workshops (GC Wkshps), 2015 IEEE, 6 pages.

Wyner, "The Wire-Tap Channel", The Bell System Technical Journal Devoted to the Scientific and Engineering Aspects of Electrical Communication, vol. 54, No. 8, Oct. 1975, 34 pages.

* cited by examiner

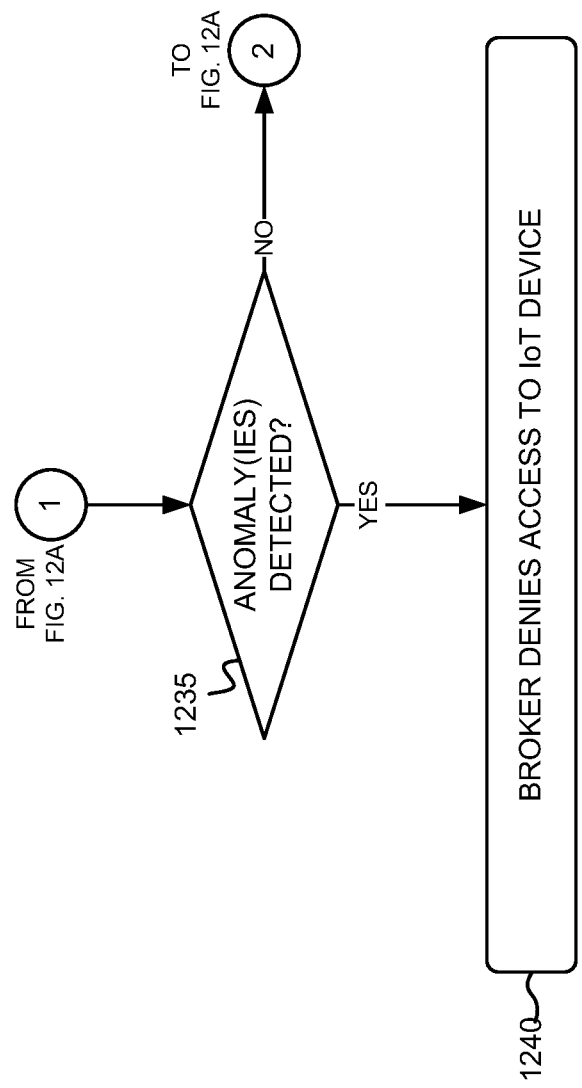

BROKERED COMMUNICATION PROTOCOL USING INFORMATION THEORETIC CODING FOR SECURITY

CROSS REFERENCE TO RELATED APPLICATIONS

The present application is a continuation of, and claims priority to, U.S. application Ser. No. 16/717,034 entitled "Brokered Communication Protocol Using Information Theoretic Coding for Security" filed Dec. 17, 2019, which is a continuation of, and claims priority to, U.S. application Ser. No. 15/795,438, filed Oct. 27, 2017 and issued as U.S. Pat. No. 10,547,632. The contents of these two prior applications are incorporated by reference herein in their entirety.

BACKGROUND

The "Internet of Things" (IoT) is a network of physical devices (i.e., "things") specially designed for specific functions, unlike general computing devices such as desktop or laptop computers. IoT devices are embedded with electronics and network connectivity that enable these devices to collect, store and exchange data. The network connectivity may include, for example, Bluetooth™ connectivity, Wi-Fi connectivity, and/or cellular network connectivity. An IoT device may additionally have computational capability, with various installed software (e.g., applications or "apps"), and may also include one or more of various types of sensors and/or actuators. An IoT device may be, via the network connectivity, controlled remotely across existing network infrastructure. An IoT device may use the network connectivity to communicate with other IoT devices, or with certain nodes (e.g., a particular server or computer) across the Internet.

BRIEF DESCRIPTION OF THE DRAWINGS

FIGS. 12A and 12B are flow diagrams that illustrate an exemplary process for implementing a brokered communication protocol that grants or denies access to a device based on information theoretic coding techniques, and controls device memory usage and device connectivity based on monitored traffic to and from the device;

DETAILED DESCRIPTION OF THE PREFERRED EMBODIMENTS

Figure 1A:
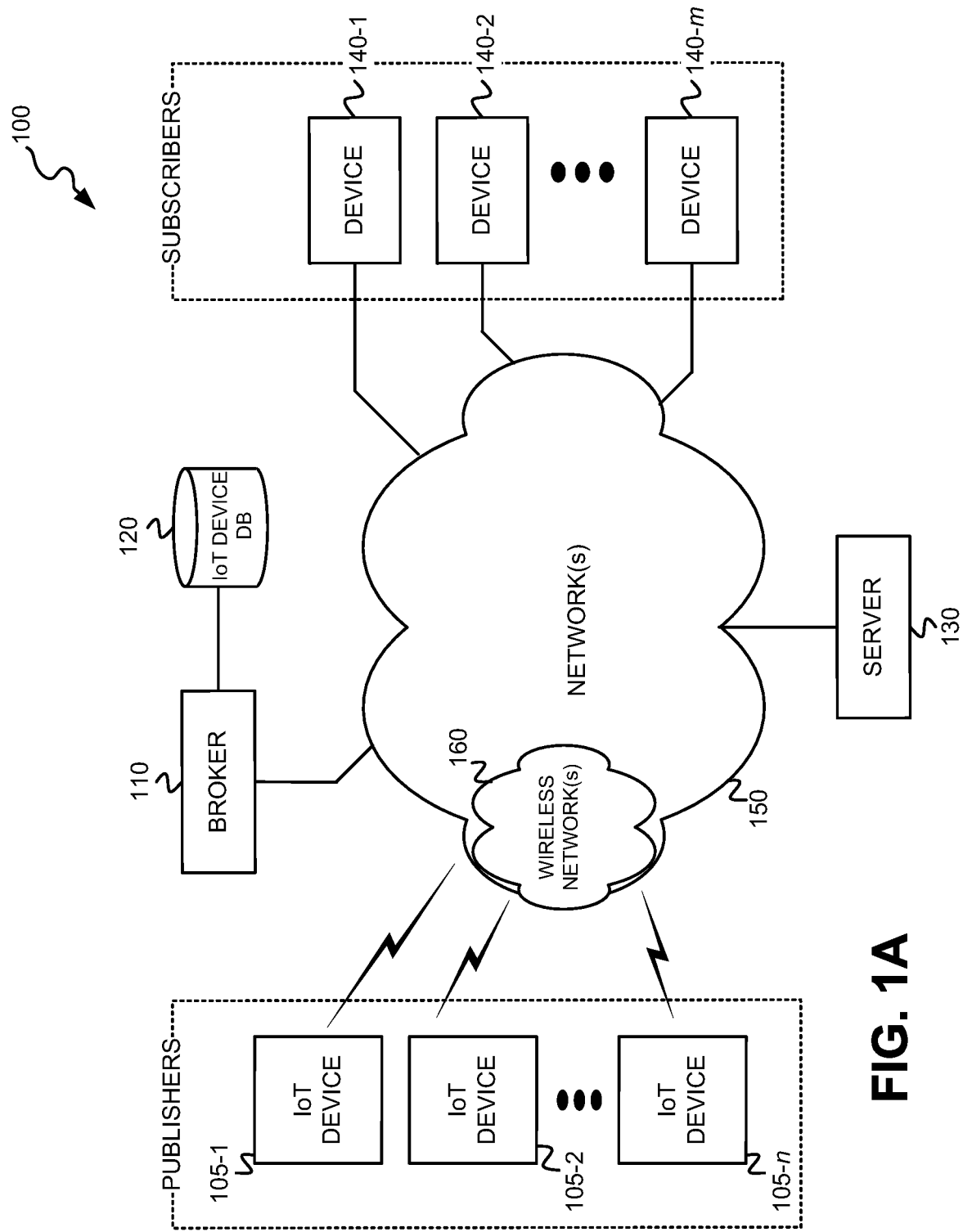
FIG. 1A illustrates an exemplary network environment in which a brokered communication protocol may be implemented using information theoretic coding techniques.

The following detailed description refers to the accompanying drawings. The same reference numbers in different drawings may identify the same or similar elements. The following detailed description does not limit the invention.

Message Queuing Telemetry Transport (MQTT) is a brokered communication protocol that provides messaging transport to remote nodes in environments where network bandwidth may be limited. MQTT supports wireless networks having varying levels of bandwidth constraints or unreliable connections. MQTT uses a publish/subscribe messaging model that requires a message broker who is responsible for distributing messages/content to clients. In the publish/subscribe model of MQTT, multiple clients connect to a broker and subscribe to topics in which they are interested. Clients also connect to the broker and publish messages to topics. Publishers send their data to the broker, and subscribers connect to the broker to access specific data published by the publishers. A device participating in the brokered communication protocol can be both a publisher and a subscriber. The broker classifies published data by specific topics prior to permitting access to the data from enrolled subscribers. In MQTT, the broker, therefore, acts as an interface to which all clients/devices connect for access.

During execution of a brokered communication protocol, such as MQTT, messages sent between a party/device Alice (i.e., an IoT device) to a legitimate receiver Bob (i.e., the broker device) over a channel, such as a wireless channel, may be potentially compromised or eavesdropped. "Eavesdropping," as referred to herein, includes interception of an encoded, transmitted message by an eavesdropper, and an accurate decoding of the message by the eavesdropper to recover the original message. Exemplary embodiments described herein employ an information theoretic technique that involves scrambling transmitted messages, encoding the scrambled messages using systematic coding, puncturing a public key (e.g., Alice's public key) from the encoded message, and monitoring bit-error-rate (BER) and/or signal-to-noise ratio (SNR) measurements at the legitimate receiver, the broker. The broker, as described herein, may ensure that the eavesdropper cannot receive and/or accurately decode the message sent by Alice (i.e., an IoT device) by ensuring that certain BER and/or SNR thresholds are maintained by the transmitter Alice. For example, the broker may prevent eavesdropping of Alice's transmissions by, for example, denying Alice access via the brokered communication protocol based on the monitored BER and/or SNR measurements. As another example, the broker may additionally prevent eavesdropping of Alice's message via use of the information theoretic technique that ensures a low enough level of BER at the broker, while also assuring a BER at the eavesdropper as close as possible to, for example, 0.5. The information theoretic technique used in the brokered communication protocol described herein, therefore, ensures a BER and/or SNR advantage between the legitimate receiver (e.g., the broker) and the eavesdropper such that the broker has an acceptable reliability error rate for receiving transmissions from Alice, but the eavesdropper has a minimum error rate that precludes accurate decoding of any message sent via the brokered communication protocol.

FIG. 1A illustrates an exemplary network environment 100 in which a brokered communication protocol may be implemented using information theoretic coding techniques. Network environment 100 may include multiple publisher IoT devices 105-1 through 105-n, a broker 110, an IoT device database (DB) 120, a server 130, multiple subscriber devices 140-1 through 140-m, and a network(s) 150 that further includes, or is connected to, a wireless network(s) 160.

IoT devices 105-1 through 105-n (generically referred to herein as "IoT devices 105" or "IoT device 105") each include a physical object or device (i.e., a "thing") that may be designed for a specific function(s) and which may be embedded with electronics, memory storage, and network connectivity hardware/software that enables these objects or devices to collect, store and exchange data with other IoT devices or with certain network nodes, such as subscriber devices 140. Each IoT device 105's network connectivity may include, for example, Bluetooth™ connectivity, Wi-Fi connectivity, and/or cellular network connectivity.

Broker 110 includes one or more network devices that implement a brokered communication protocol that makes broker 110 a centralized brokering node for authenticating publisher IoT devices 105, and for serving as an intermediary for connecting, based on the authenticating, IoT devices 105 with one another, or to subscriber devices 140, and for connecting subscriber devices 140 to publisher IoT devices 105. Broker 110 enrolls IoT devices 105 in the brokered communication protocol, enables publisher IoT devices 105 to publish data, and subscriber devices 140 to subscribe to particular topics such that any data posted to those particular topics are made available to the subscriber devices 140. In one implementation, the brokered connectivity/messaging protocol includes a modified version of MQTT, where the messaging involved in the brokered communication protocol is modified to use information theoretic coding techniques, as described further herein. Broker 110 may maintain broadcast/multicast tables that map enrolled publishers with particular enrolled subscribers such that data published by a publisher to a particular topic may be made available to one or more subscribers that have subscribed to that topic. Each topic may be specific to a particular publisher (e.g., an IoT device 105), or may be associated with multiple different publishers such that multiple different devices may publish to a same topic (e.g., IoT devices 105-1 through 105-5 publish to a particular, same topic). Broker 110 may additionally maintain a table that maps an association between an IMSI for each IoT device 105 and a corresponding pseudo-name for the IMSI. Use of a pseudo-name for each IMSI avoids the transmission of IMSIs which, in turn, prevents the tracking and identification of particular devices on the radio interface.

IoT device DB 120 includes one or more network devices that store a data structure(s) that further stores information regarding IoT devices 105 that have enrolled in the brokered communication protocol implemented by broker 110. Each entry of the data structure of DB 120 may store information for each IoT device 105 enrolled in the brokered communication protocol implemented by broker 110. Details of an exemplary implementation of IoT device DB 120 is described below with respect to FIG. 3. As shown in FIG. 1A, IoT device DB 120 may, in one implementation, connect directly to broker 110, without connecting directly to network(s) 150. Broker 110 may, therefore, directly access IoT device DB 120 to query, retrieve, and/or store data.

Server 130 includes one or more network devices that receive and store registrations for IoT device 105 owned, operated and/or administered by a single individual or entity that may be associated with the server 130. For example, Company_X may own a group of IoT devices 105, and may register the IoT devices 105 at Company_X's server 130. Server 130 may, subsequent to registration, enroll the IoT devices 105 with broker 110 for engaging in the brokered communication protocol via broker 110.

Subscriber devices 140-1 through 140-m each include a network device that connects to network(s) 150 and/or network(s) 160 and which either serve as a posting device for IoT devices 105 to post data thereto, or access devices for subscribing to certain topics, and accessing data associated with those topics, via broker 110 and the brokered communication protocol.

Network(s) 150 includes one or more networks of various types including, for example, a public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a satellite mobile network, a telecommunications network (e.g., Public Switched Telephone Networks (PSTNs)), a wired and/or wireless local area network (LAN), a wired and/or wireless wide area network (WAN), a metropolitan area network (MAN), an intranet, the Internet, or a cable network (e.g., an optical cable network). In one implementation, network(s) 150 may include a PLMN or satellite mobile network connected to the Internet. In another implementation, network(s) 150 may include a fixed network (e.g., an optical cable network) connected to the Internet. As shown in FIG. 1A, network(s) 150 may include, or may connect to, a wireless network(s) 160. Wireless network(s) 160 may include one or more of a PLMN, a wireless LAN, and/or a personal area network (PAN). Each PAN may include a lower-powered PAN carried over a short distance wireless technology such as, for example, Insteon, Infrared Data Association (IrDA), Wireless Universal Serial Bus (USB), Bluetooth, Z-Wave, Zigbee, and/or Body Area Network.

The configuration of the components of network environment 100 depicted in FIG. 1A is for illustrative purposes only, and other configurations may be implemented. Therefore, network environment 100 may include additional, fewer and/or different components, that may be configured differently, than depicted in FIG. 1A. For example, though a single server 130 is depicted in FIG. 1A, multiple different servers 130 may connect to network(s) 150, with each different server 130 possibly being associated with a different individual or entity that owns, operates, or administers a different group of IoT devices 105.

Figure 1B:
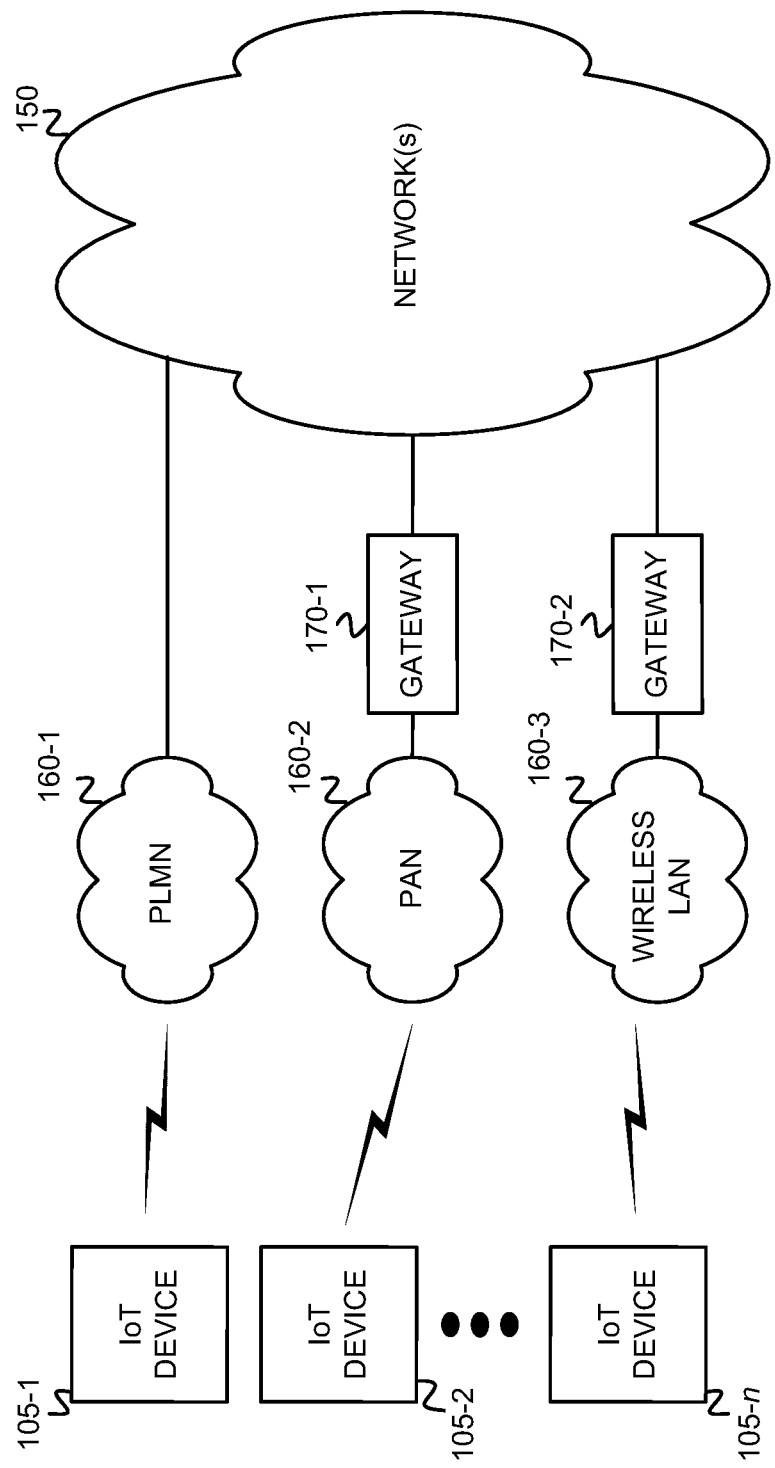
FIG. 1B depicts an exemplary implementation in which the wireless network of FIG. 1A includes a Public Land Mobile Network, a Personal Area Network, and a wireless Local Area Network.

FIG. 1B depicts an exemplary implementation in which wireless network(s) 160 of FIG. 1A includes a PLMN 160-1, a PAN 160-2, and a wireless LAN 160-3. IoT devices 105 may variously connect to PLMN 160-1, PAN 160-2, and/or wireless LAN 160-3. Each IoT device 105 may connect to only a single wireless network 160, or may connect to multiple different wireless networks 160. In the example of FIG. 1B, IoT device 105-1 connects to PLMN 160-1 which further connects to network(s) 150, IoT device 105-2 connects to PAN 160-2 which further connects to network(s) 150 via a gateway 170-1, and IoT device 105-n connects to wireless LAN 160-3 which further connects to network(s) 150 via a gateway 170-2. In the example depicted in FIG. 1B, IoT device 105-1 may transmit (e.g., post data, send requests) via PLMN 160-1 to network(s) 150, IoT device 105-2 may transmit via PAN 160-2, gateway 170-1, and network(s) 150, and IoT device 105-n may transmit via wireless LAN 160-3, gateway 170-2, and network(s) 150.

Figure 2:
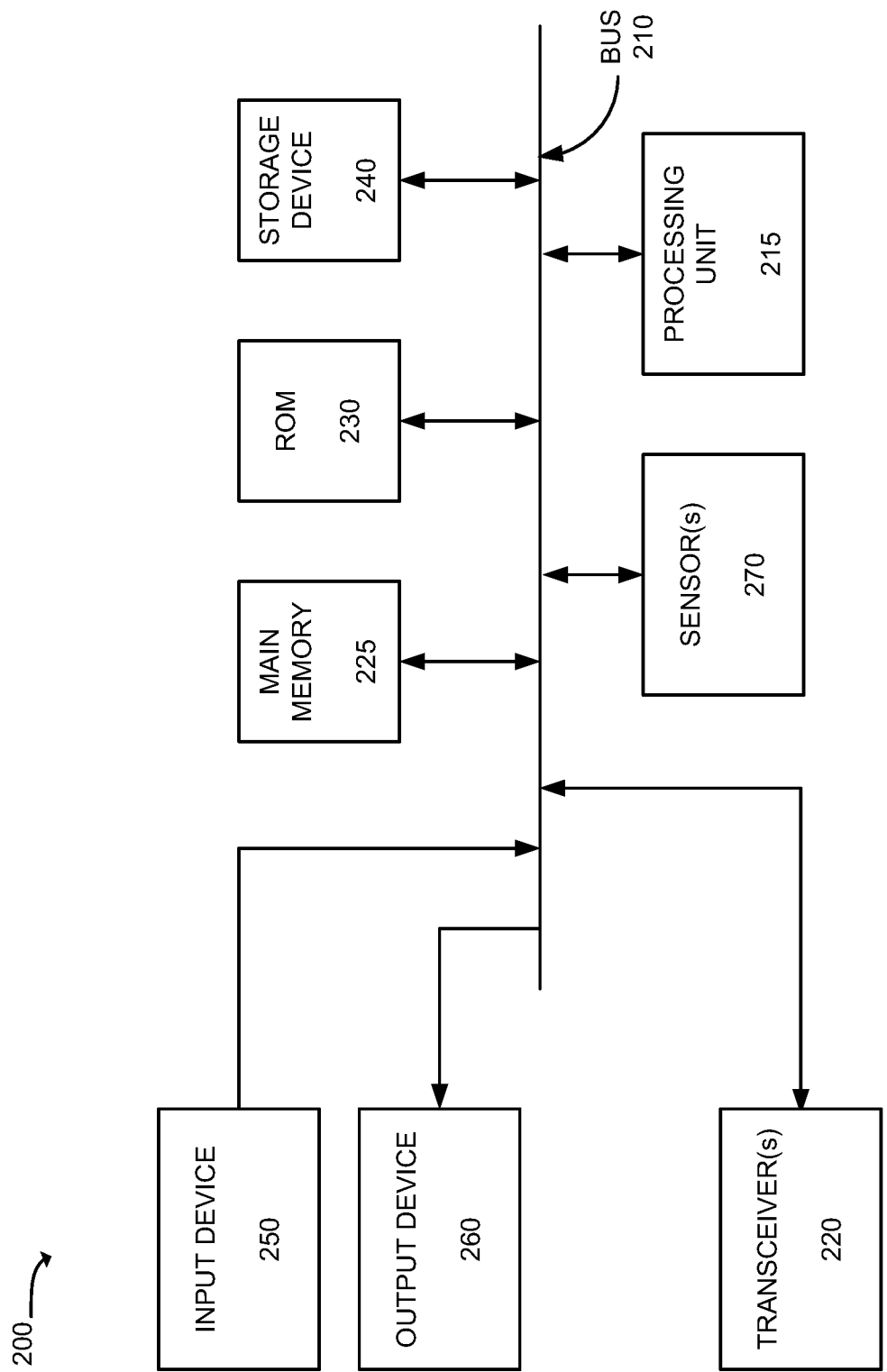
FIG. 2 is a diagram that depicts exemplary components of a computational device that may correspond to the publisher IoT devices, broker, IoT device database, server, and subscriber devices of FIG. 1A.

FIG. 2 is a diagram that depicts exemplary components of a computational device 200 (referred to herein as "device 200"). IoT devices 105, broker 110, IoT device DB 120, server 130, and devices 140 may each be configured similarly to device 200, possibly, in some circumstances with some variations in components and/or configuration. Device 200 may include a bus 210, a processing unit 215, a main memory 225, a transceiver(s) 220, a read only memory (ROM) 230, a storage device 240, an input device(s) 250, an output device(s) 260, and a sensor(s) 270.

Bus 210 may include a path that permits communication among the components of device 200. Processing unit 215 may include one or more processors or microprocessors, or processing logic, which may interpret and execute instructions. Transceiver(s) 220 may include one or more transceivers that enable device 200 to communicate with other devices and/or systems. For example, transceiver(s) 220 may include one or more wireless transceivers for communicating via wireless network(s) 160, and/or one or more wired transceivers for communicating via network(s) 150.

Main memory 225 may include a random access memory (RAM) or another type of dynamic storage device that may store information and instructions for execution by processing unit 215. ROM 230 may include a ROM device or another type of static storage device that may store static information and instructions for use by processing unit 215. Storage device 240 may include a magnetic and/or optical recording medium. Main memory 225, ROM 230 and storage device 240 may each be referred to herein as a "tangible non-transitory computer-readable medium."

Input device 250 may include one or more mechanisms that permit an operator to input information to device 200, such as, for example, a keypad or a keyboard, a display with a touch sensitive panel, voice recognition and/or biometric mechanisms, etc. Output device 260 may include one or more mechanisms that output information to the operator or user, including a display, a speaker, etc. Input device 250 and output device 260 may, in some implementations, be implemented as a graphical user interface (GUI) that displays GUI information and which receives user input via the GUI. For example, the GUI of input device 250 and output device 260 may include a touch screen GUI that uses any type of touch screen device.

The configuration of components of device 200 shown in FIG. 2 is for illustrative purposes. Other configurations may be implemented. Therefore, device 200 may include additional, fewer and/or different components, arranged in a different configuration, than depicted in FIG. 2. For example, if device 200 is an IoT device 105, device 200 may include similar components to those shown in FIG. 2, but may omit input device 250, output device 260, and storage device 240. As another example, if device 200 is broker 110, IoT device DB 120, device 140, or server 130, device 200 may also include similar components to those shown in FIG. 2, but may omit sensor(s) 270.

Figure 3:
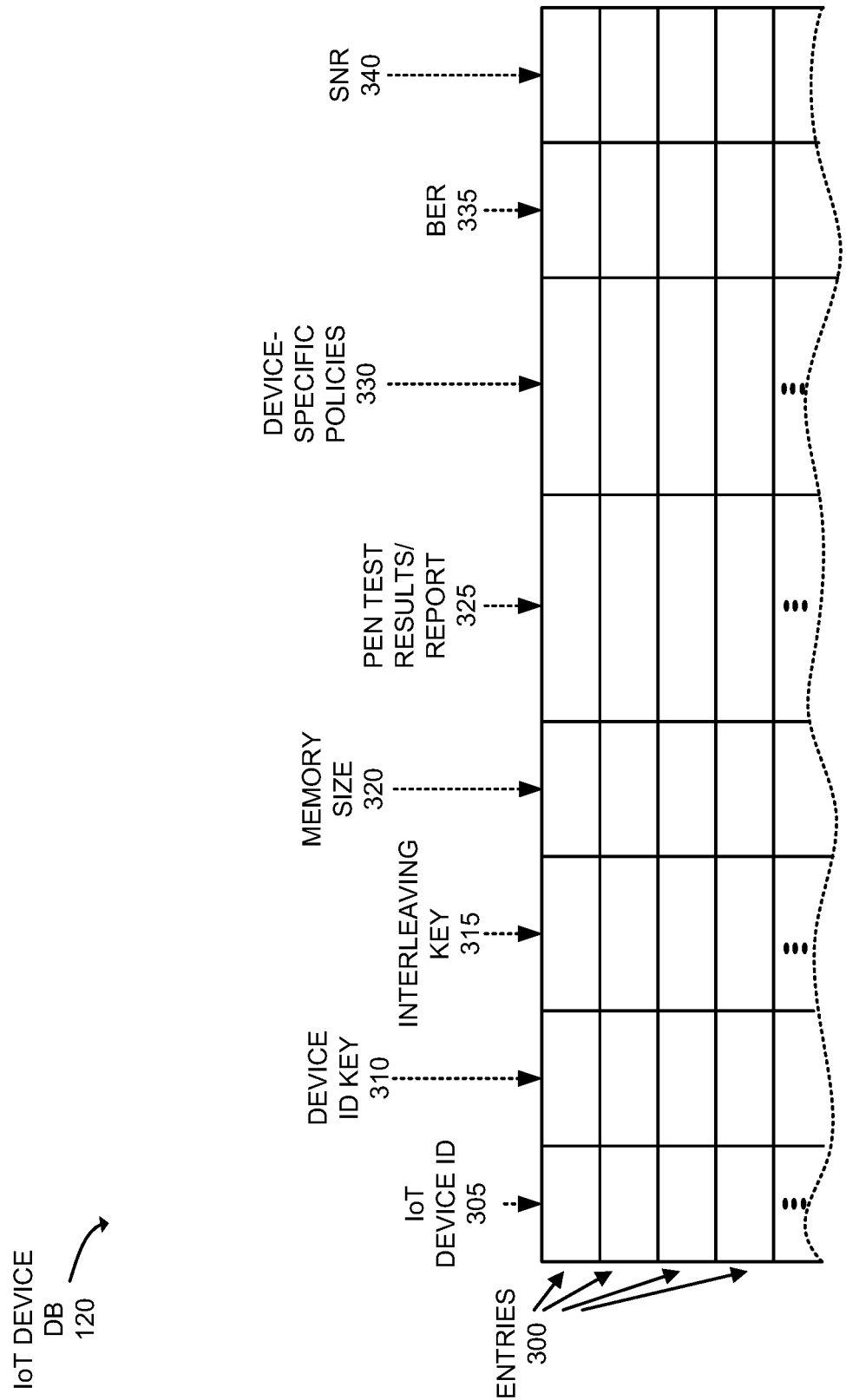
FIG. 3 is a diagram that depicts an exemplary implementation of the IoT device database of FIG. 1A.

FIG. 3 is a diagram that depicts an exemplary implementation of IoT device DB 120. As shown, a data structure of DB 120 may include multiple entries 300, with each entry 300 including an IoT device identifier (ID) field 305, a device ID key field 310, an interleaving key field 315, a memory size field 320, a pen test results/report field 325, a device-specific policies field 330, a bit-error-rate (BER) field 335, and a signal-to-noise ratio (SNR) field 340.

IoT device ID field 305 may store a globally unique ID (GUID) for a particular IoT device 105 enrolled in the IoT connectivity protocol described herein. The GUID may, for example, be installed within an IoT device 105 by a manufacturer of the device. Device ID key field 310 may store a unique device ID key, generated by, for example, broker 110, and supplied to the IoT device 105 identified in field 305. In one implementation, the device ID key may be generated based on the GUID IoT device ID. For example, broker 110 may apply an algorithm, such as a Hash algorithm, to the GUID to generate the device ID key. Interleaving key field 315 may store an interleaving key generated by, for example, broker 110 using a random bit sequence generator that may be used for specifying a interleaving permutation applied to multiple portions of a message.

Memory size field 320 stores data that indicates a total amount of memory available at the IoT device 105 identified by field 305 and, possibly, a current amount of the total memory that is being used for storage. To prevent Botnet attacks, a memory utilization threshold of, for example, 90% may be used to stop traffic to a particular device and prevent denial of service attacks that cause memory overflow within victim devices. Pen test results/report field 325 stores data that identifies the results of a penetration test(s) performed by broker 110 upon the IoT device 105 identified by field 305, or data associated with a penetration results report obtained from an independent source. A penetration test (referred to as a "pen test") includes a simulated attack on the IoT device 105 to look for security weaknesses and obtain access to the IoT device 105's data. The simulated attack includes existing tests that are applicable to determining security weakness of the IoT device 105. A penetration test typically includes discovering the vulnerabilities of the IoT device 105 via, for example, accessing the IoT device 105 and performing one or more legal operations to permit the tester to execute an illegal or prohibited operation. The penetration test typically further includes exploiting the discovered vulnerabilities via the illegal or prohibited operation.

Device-specific policies field 330 stores one or more policies, such as a connectivity restriction policy and/or a memory utilization throttling policy, that may be used by broker 110 to control the connectivity of the IoT device 105 identified by field 305, or to control the memory utilization of the IoT device 105 identified by field 305. The device-specific policies may be retrieved from field 330 of DB 120 by broker 110 and applied to the IoT device 105 based on the monitoring of IoT device traffic or memory usage, such as, for example, as described with respect to block 1225 of FIG. 12A below. BER field 335 stores data indicating a bit-error-rate (BER) measured by the transceiver of the IoT device 105 identified in the corresponding field 305. SNR field 340 stores data indicating a signal-to-noise ratio (SNR) measured by the transceiver of the IoT device 105 identified in the corresponding field 305.

To locate a particular entry, IoT device DB 120 may be queried with, for example, a IoT device ID to locate an entry 300 having a matching device ID in field 305, or with a device ID key to locate an entry 300 having a matching device ID key in field 310. When such an entry 300 is located, data may be stored in one or more fields 305, 310, 315, 320, 325, 330, 335 and/or 340 of the entry 300, or data may be retrieved from one or more of fields 305, 310, 315, 320, 325, 330, 335 and/or 340 of the entry 300. Other fields of an entry 300, instead of IoT device ID field 305 or device ID key field 310, may be used for querying DB 120.

IoT device DB 120 is depicted in FIG. 3 as including a tabular data structure with certain numbers of fields having certain content. The tabular data structure of DB 120 shown in FIG. 3, however, is for illustrative purposes. Other types of data structures may alternatively be used. The number, types, and content of the entries and/or fields in the data structure of DB 120 illustrated in FIG. 3 are also for illustrative purposes. Other data structures having different numbers of, types of and/or content of, the entries and/or the fields may be implemented. Therefore, IoT device DB 120 may include additional, fewer and/or different entries and/or fields than those depicted in FIG. 3. For example, each entry 300 may include a field for storing an International Mobile Subscriber Identity (IMSI) and an Integrated Circuit Card ID (ICCID) associated with an IoT device 105.

Figure 4:
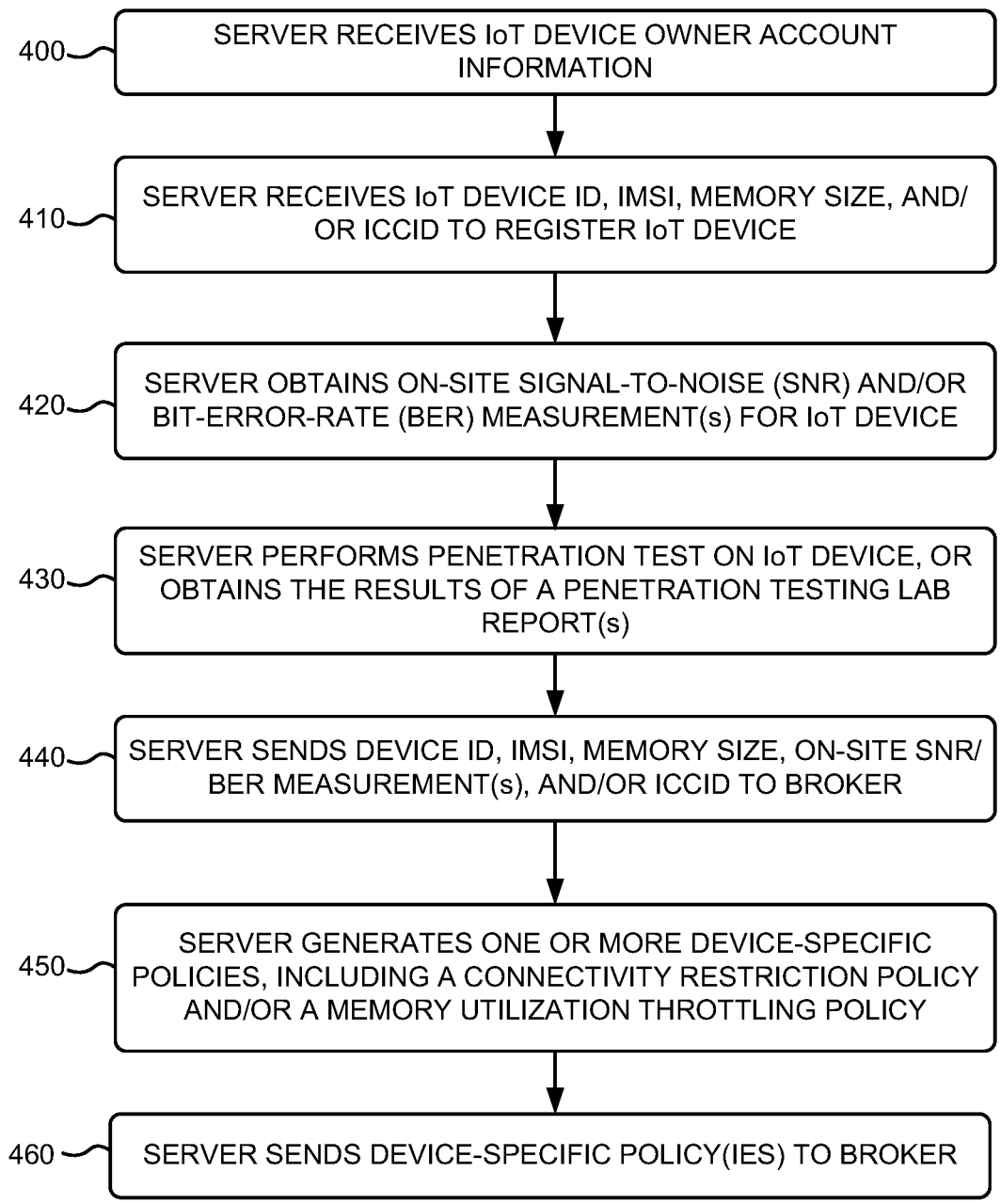
FIG. 4 is a flow diagram that illustrates an exemplary process for registering an IoT device with a server associated with a particular owner, operator and/or administrator.

FIG. 4 is a flow diagram that illustrates an exemplary process for registering an IoT device 105 with a server 130 associated with a particular owner, operator and/or administrator. The exemplary process of FIG. 4 may be implemented by server 130. The exemplary process of FIG. 4 is described below with reference to the messaging/operation diagram of FIG. 5.

Figure 5:
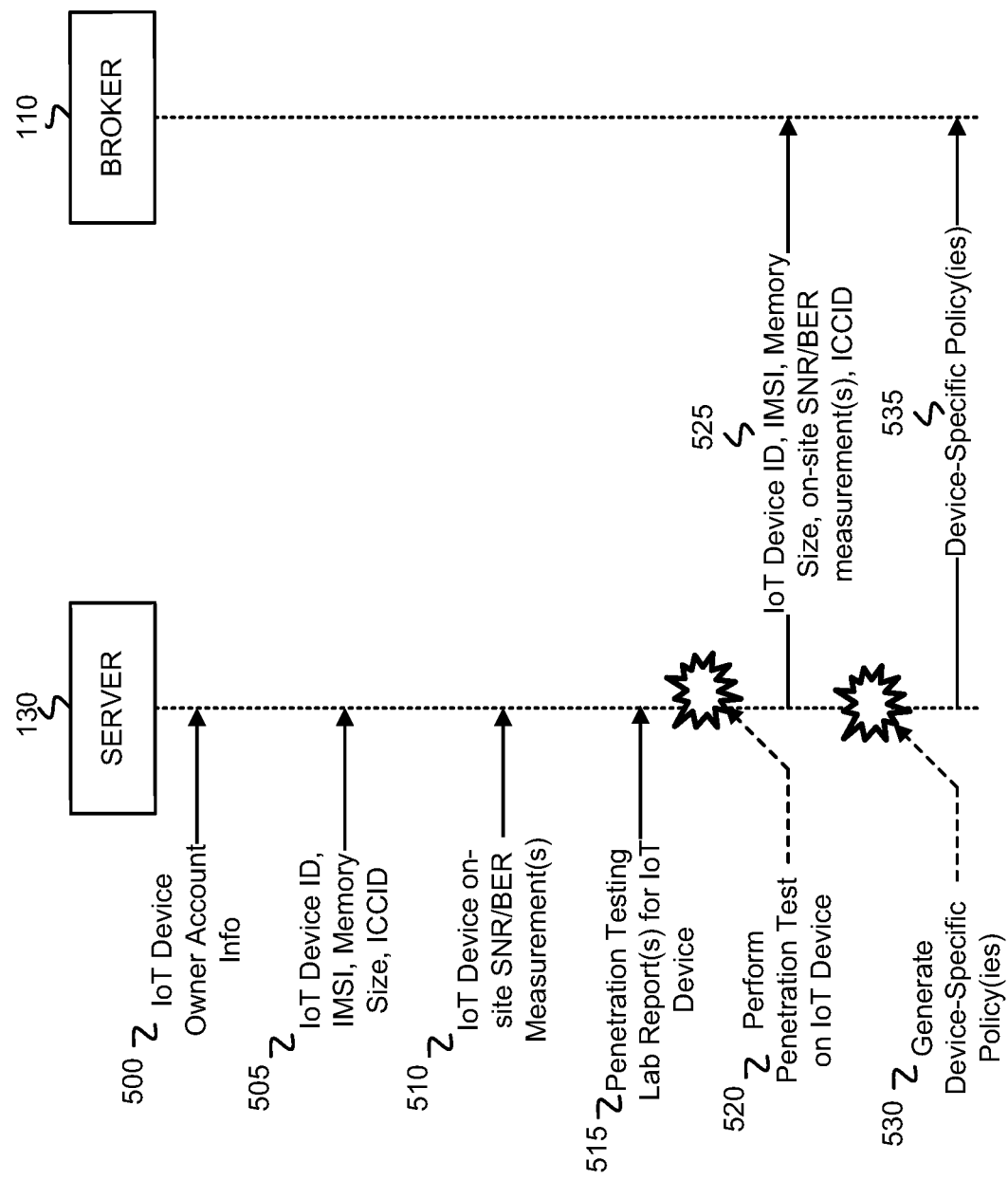
FIG. 5 is a messaging/operation diagram associated with the exemplary process of FIG. 4.

The exemplary process includes server 130 receiving IoT device owner account information (block 400). The owner, operator and/or administrator associated with a particular server 130, and one or more IoT devices 105, may provide account information, such as, for example, individual/entity name, geographic address, email address, phone number, and financial charging information (e.g., debit card, credit card, bank account, etc.). Server 130 stores the IoT device owner account information for future retrieval. FIG. 5 depicts server 130 receiving 500 IoT device owner account information.

Server 130 receives an IoT device identifier (ID), an IMSI, a memory size, and/or an ICCID to register an IoT device 105 (block 410). The IoT device ID uniquely identifies the IoT device 105 being registered, and the ICCID uniquely identifies an integrated circuit card (e.g., a smart card) deployed at the IoT device 105. The IoT device ID may have been assigned by the manufacturer of the IoT device 105, and stored in local memory. The IMSI is the International Mobile Subscriber Identity associated with the IoT device 105 in circumstances where the IoT device 105 includes a cellular transceiver for communicating via a PLMN. The memory size identifies an amount of local memory that is available for use at the IoT device 105. FIG. 5 depicts server 130 receiving 505 the IoT device ID, IMSI, memory size, and/or ICCID.

Server 130 obtains on-site signal-to-noise (SNR) and/or bit-error-rate (BER) measurement(s) for the IoT device 105 (block 420). Once the IoT device 105 has been positioned on-site at the location at which it is going to operate, server 130 may remotely access the baseband processor of the IoT device 105 to command the IoT device 105 to perform SNR and/or BER measurements that can then be reported back to the server 130. Alternatively, an administrator, operator, or technician associated with an entity that is responsible for server 130 may manually perform SNR and/or BER measurements at the on-site location of the IoT device 105, and manually enter the SNR and/or BER measurements read from the IoT device 105 into a hardcopy log. The administrator, operator, or technician may subsequently manually enter the SNR/BER measurement data into server 130 for the IoT device 105. FIG. 5 depicts server 130 obtaining 510 SNR/BER measurements of the on-site IoT device 105.

Server 130 performs a penetration test on the IoT device 105, or obtains results of a penetration testing lab report(s) for the IoT device (block 430). As already described, the penetration test (referred to as a "pen test") includes a simulated attack on the IoT device 105 to look for security weaknesses and obtain access to the IoT device 105's data. Server 130 may include one or more processes that perform the penetration test(s) upon the IoT device 105. Alternatively, the vulnerabilities of the particular type of IoT device 105 may be previously known, and detailed in a penetration testing report that may be obtained by server 130. An analysis of the results of the performed penetration test, or the obtained penetration testing report, enable server 130 to generate device-specific policies, such as connectivity restriction policies and/or memory utilization throttling policies, and also enables server 130 to identify anomalies in the operation or traffic of the IoT device 105. FIG. 5 depicts server 130 obtaining 515 a penetration testing lab report(s) for the IoT device, or performing 520 a penetration test on the IoT device.

Server 130 sends the device ID, the IMSI, the memory size, on-site SNR/BER measurement(s), and/or the ICCID to broker 110 (block 440). Server 130 may transmit the information to broker 110 via network(s) 150. FIG. 5 depicts server 130 sending 525 the IoT device ID, IMSI, memory size, on-site SNR/BER measurement(s), and ICCID to broker 110. Server 130 generates one or more device-specific policies, including a connectivity restriction policy, and/or a memory utilization throttling policy (block 450), and sends the device-specific policy(ies) to broker 110 (block 460). The connectivity restriction policy may specify rules that exercise control over the connectivity of the IoT device 105. The connectivity restriction policy may, for example, include rules that disconnect the IoT device 105 from the brokered communication protocol when certain traffic conditions occur. The memory utilization throttling policy may specify rules that exercise control over the memory usage at the IoT device 105. The memory utilization throttling policy may, for example, include rules that throttle traffic from the corresponding IoT device 105 when memory utilization at that device reaches a certain threshold value. FIG. 5 depicts server 130 generating 530 the device-specific policy(ies), and sending 535 the device-specific policy(ies) to broker 110.

Figure 6:
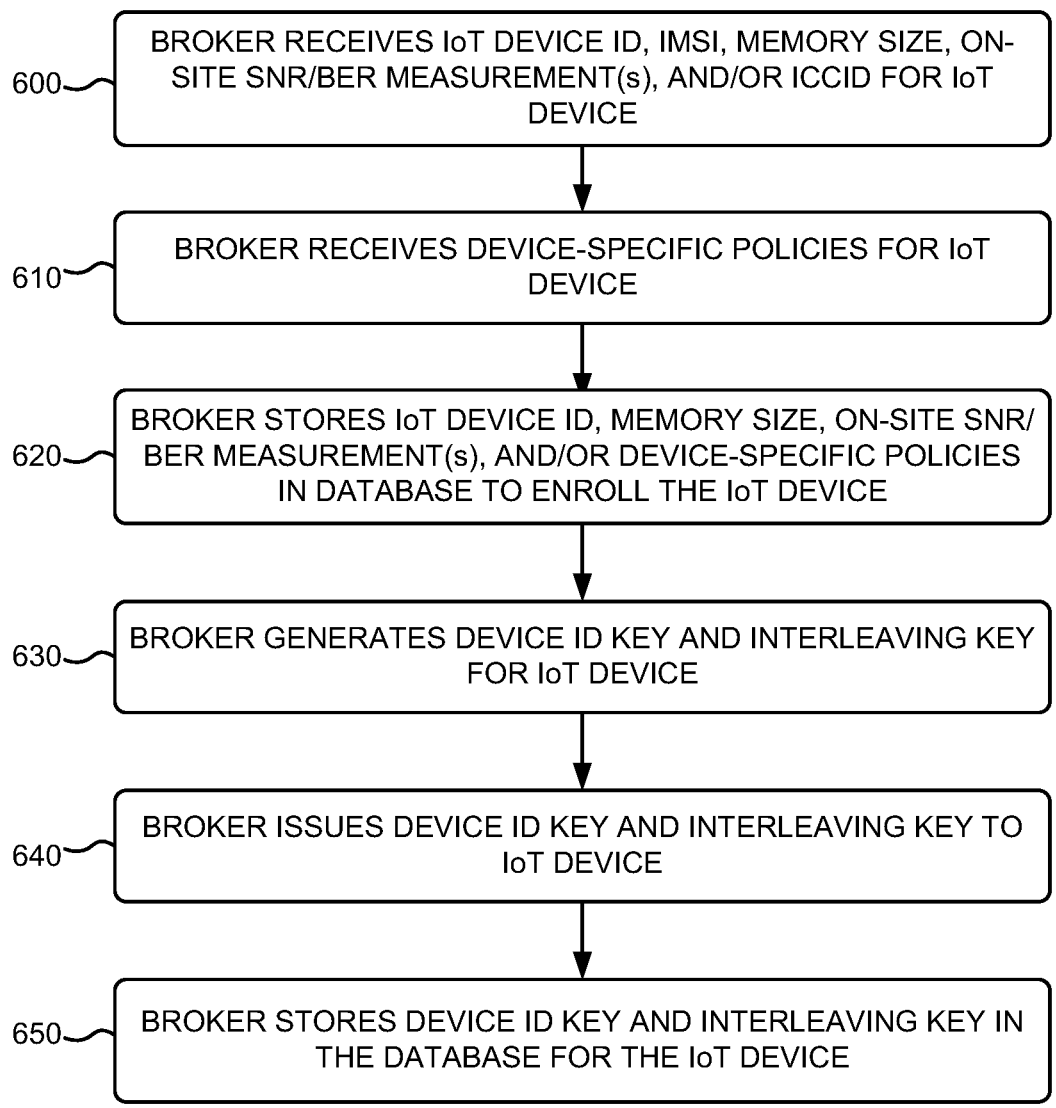
FIG. 6 is a flow diagram that illustrates an exemplary process for enrolling an IoT device in the brokered communication protocol described herein.

FIG. 6 is a flow diagram that illustrates an exemplary process for enrolling an IoT device 105 in the brokered communication protocol described herein. The exemplary process of FIG. 6 may be implemented by broker 110, in response to server 130 executing the blocks of the process of FIG. 4, including blocks 430 and 450 in which enrollment data is sent from server 130 to broker 110. The exemplary process of FIG. 6 is described below with reference to the messaging/operation diagram of FIG. 7.

Figure 7:
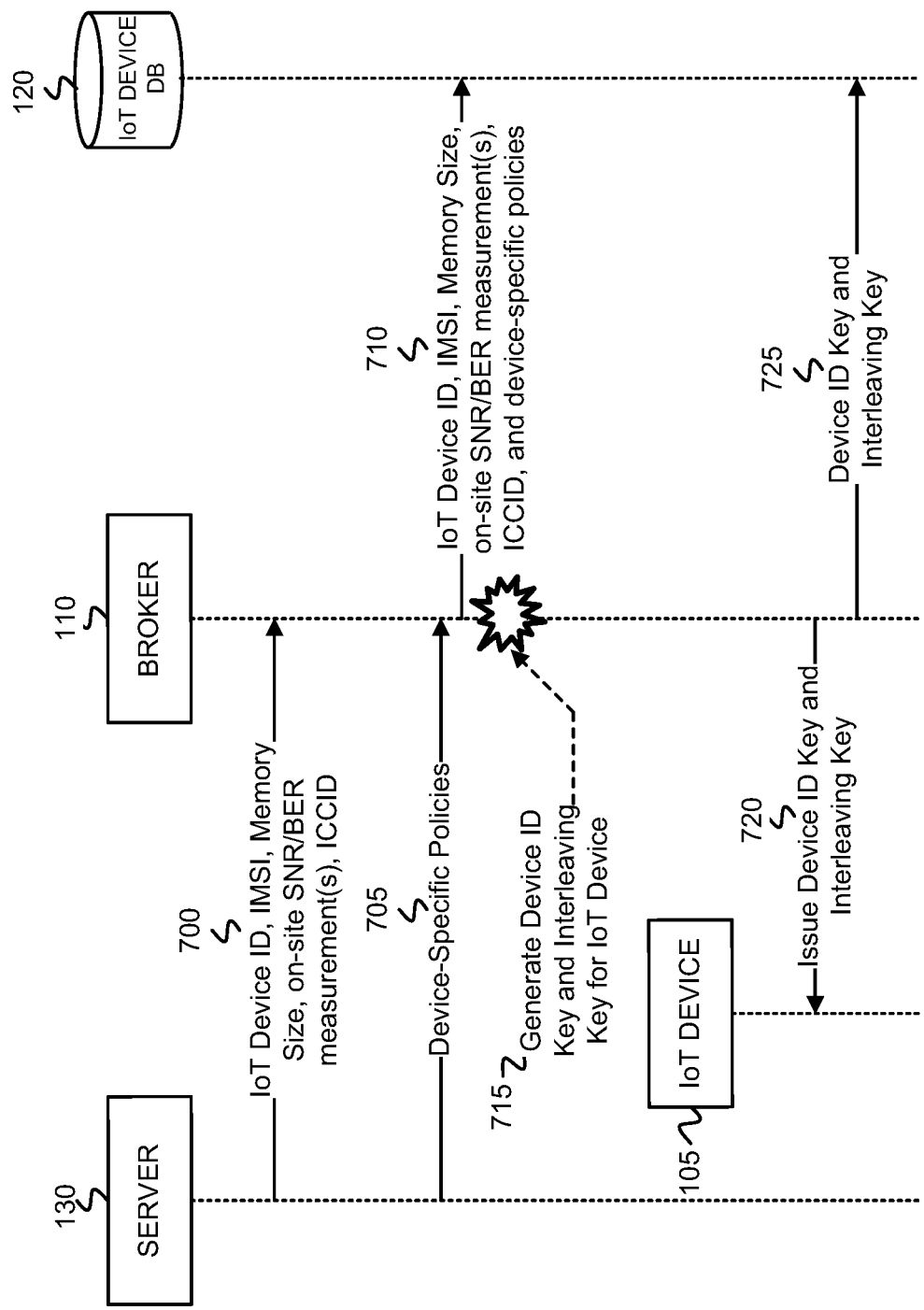
FIG. 7 is a messaging/operation diagram associated with the exemplary process of FIG. 6.

The exemplary process includes broker 110 receiving a device ID, an IMSI, a memory size, on-site SNR/BER measurement(s), and/or an ICCID for an IoT device 105 (block 600). The enrollment data received by broker 110 may include the device ID, IMSI, memory size, on-site SNR/BER measurement(s), and/or ICCID sent by server 130 for the IoT device 105 in block 440 of FIG. 4. Broker 110 may generate a pseudo-name for the received IMSI, and may store an association between the received IMSI, the device ID, and the pseudo-name within a table in memory. FIG. 7 depicts broker 110 receiving 700 an IoT device ID, an IMSI, a memory size, on-site SNR/BER measurement(s), and/or an ICCID from server 130.

Broker 110 receives device-specific policies for the IoT device 105 (block 610). The policies received by broker 110 may include the policies sent by server 130 for the IoT device 105 in block 460 of FIG. 4. Broker 110 stores the device ID, the memory size, the on-site SNR/BER measurement(s), and the device-specific policies in DB 120 to enroll the IoT device 105 (block 620). For example, broker 110 may store the device ID in field 305, the memory size in field 320, the BER measurement in field 335, the SNR measurement in field 340, and the device-specific policies in field 330, of DB 120. Additionally, broker 110 may store the received IMSI and ICCID in DB 120. FIG. 7 depicts broker 110 receiving 705 device-policies from server 130, and broker 110 storing 710 the IoT device ID, the IMSI, the memory size, the on-site SNR/BER measurement(s), the ICCID, and/or the device-specific policies in IoT device DB 120.

Broker 110 generates a device ID key and an interleaving key for the IoT device 105 (block 630), and issues the device ID key and the interleaving key to the IoT device 105 (block 640). In one implementation, broker 110 may apply an algorithm (e.g., a hash algorithm) to the IoT device ID to generate the device ID key. Other types of algorithms, however, may be used for generating the device ID key. Broker 110 may generate the interleaving key for the IoT device 105 using a random bit sequence generator. FIG. 7 depicts broker 110 generating 715 a device ID key and an interleaving key for the IoT device 105, and issuing 720 the device ID key and interleaving key to IoT device 105. Broker 110 may send the device ID key and interleaving key to IoT device 105 via network(s) 150 and wireless network(s) 160.

Broker 110 stores the device ID key and the interleaving key in the IoT device DB 120 for the IoT device 105 (block 650). Broker 110 queries IoT device DB 120 to identify an entry 300 having an IoT device ID stored in field 305 that matches the IoT device ID received by broker 110 in block 600, and stores the device ID key in field 310 and the interleaving key in field 315 of the identified entry 300. FIG. 7 depicts broker 110 storing 725 the device ID key and the interleaving key in IoT device DB 120.

Figure 8:
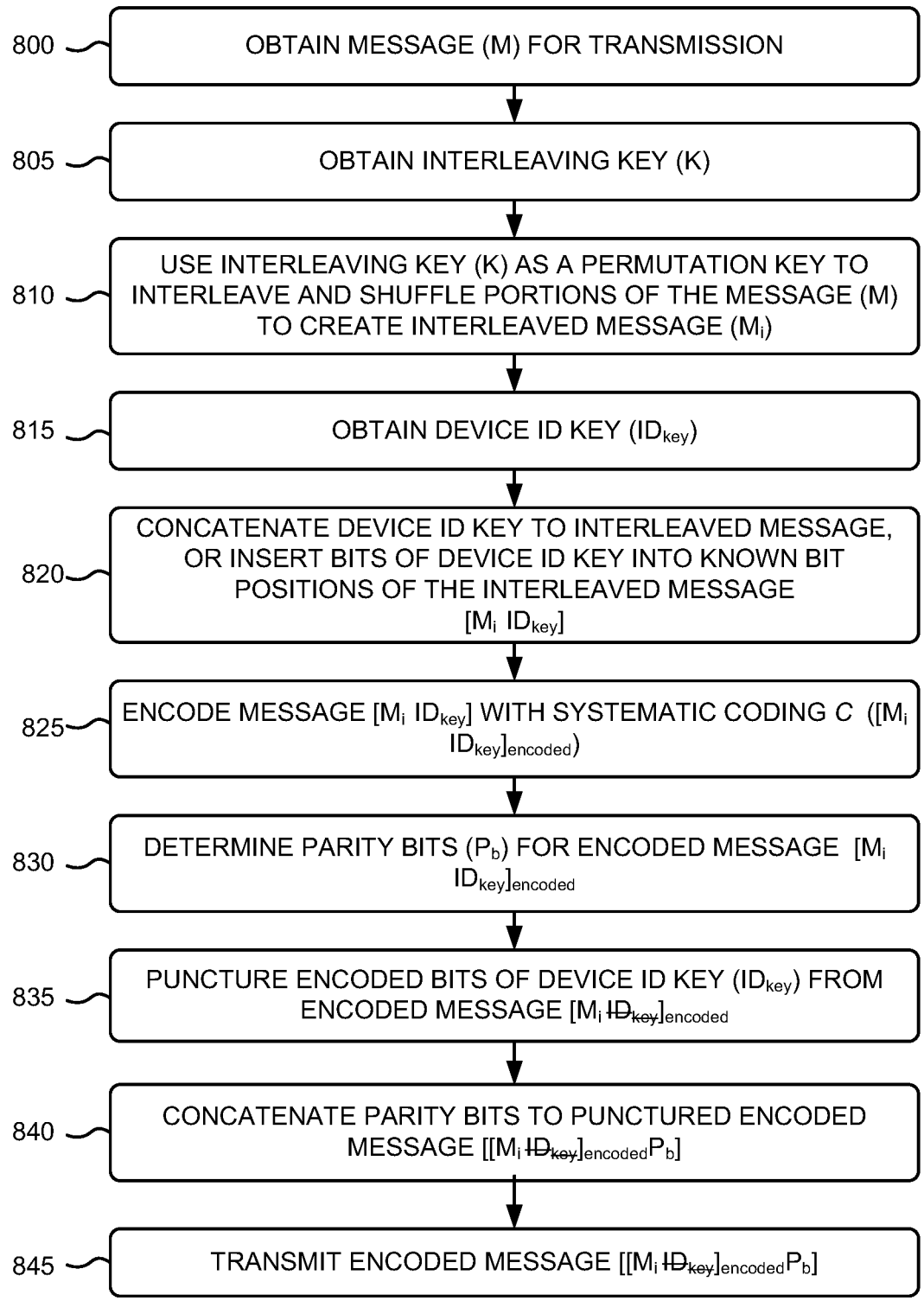
FIG. 8 is a flow diagram that illustrates an exemplary process for implementing physical layer security, using an information theoretic coding technique, when transporting a message from an originating device to a destination device.
Figure 9:
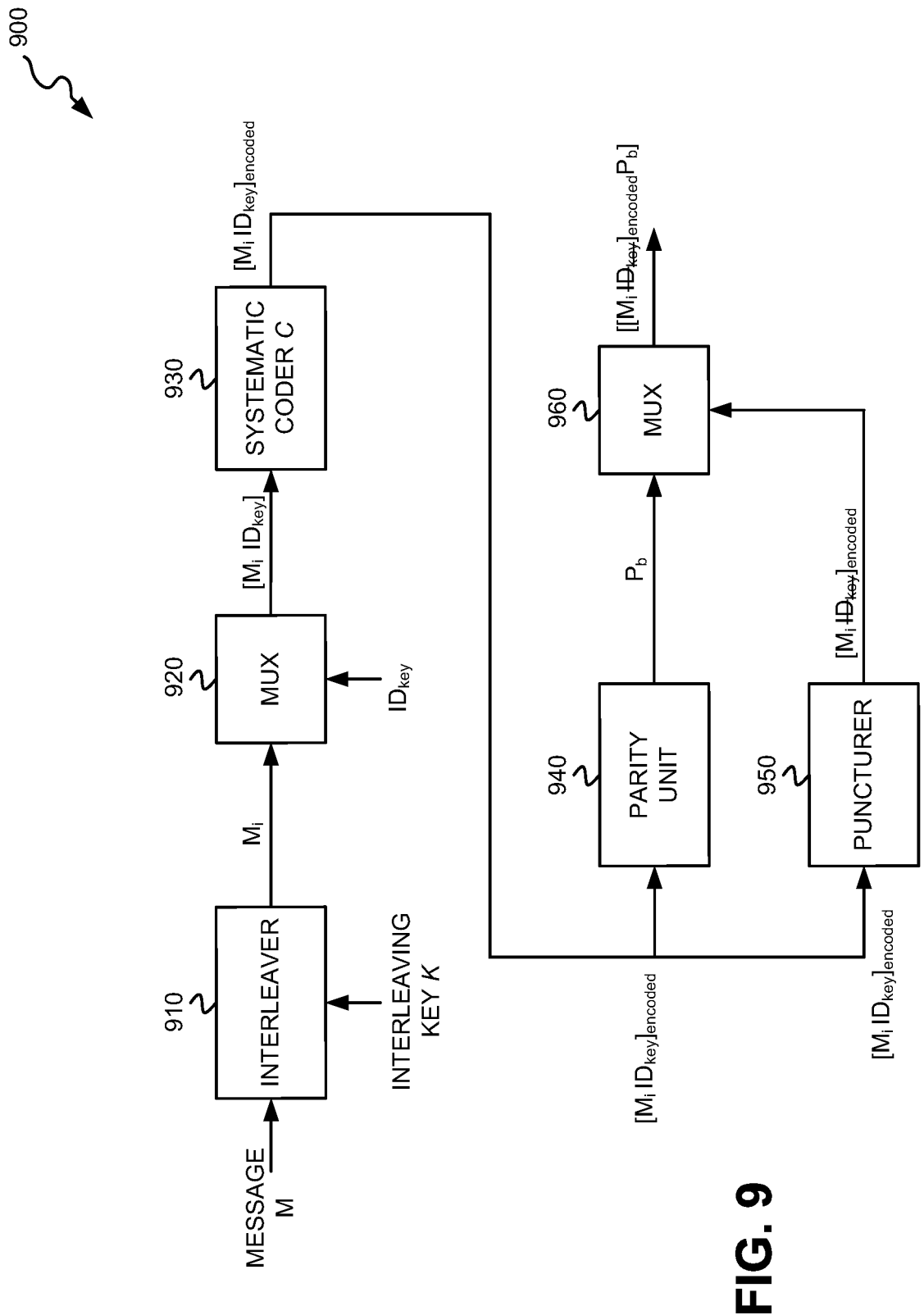
FIG. 9 is a system diagram associated with the exemplary process of FIG. 8.

FIG. 8 is a flow diagram that illustrates an exemplary process for implementing physical layer security, using an information theoretic coding technique, when transporting a message from an originating device to a destination device within the brokered communication protocol described herein. The exemplary process of FIG. 8 may be implemented by publishing IoT devices 105, broker 110, and/or subscriber devices 140 for transporting a message (M) to a destination device. For example, IoT device 105 may execute the process of FIG. 8 to transport a message M to broker 110, where the message M includes sensor data. As a further example, broker 110 may execute the process of FIG. 8 to transport a message M to IoT device 105 that includes a test vector included as part of a SNR/BER measurement request (as described with respect to FIG. 14 below). As another example, a subscriber device 140 may execute the process of FIG. 8 to request access to data stored at broker 110, or at another data repository. The exemplary process of FIG. 8 is described below with reference to system diagram of FIG. 9. In some implementations, the system 900 depicted in FIG. 9 may be implemented in software by processing unit 215 in conjunction with main memory 225, where interleaver 910, multiplexer 920, coder 930, parity unit 940, puncturer 950, and multiplexer 960 shown in FIG. 9 represent functional software entities. In other implementations, the system 900 depicted in FIG. 9 may be implemented in hardware, where interleaver 910, multiplexer 920, coder 930, parity unit 940, puncturer 950, and multiplexer 960 represent discrete hardware components.

When a transmitter Alice sends a message M to a legitimate receiver Bob, over a channel (e.g., a wireless channel), the transmitted message M may potentially be eavesdropped or intercepted by an eavesdropper Eve. However, using an information theoretic coding technique that involves scrambling the message, encoding the scrambled message using systematic coding, puncturing or removing Alice's public key from the encoded message, and then monitoring BER and/or SNR measurements at the legitimate receiver Bob (and other legitimate receivers), broker 110 may ensure that eavesdropper Eve cannot receive and/or accurately decode the message M sent by Alice. Broker 110 may prevent eavesdropping or intercepting/decoding of Alice's transmissions by, for example, denying Alice access via the brokered communication protocol based on the monitored BER and/or SNR measurements. Broker 110 may additionally prevent eavesdropping of Alice's message M via use of the information theoretic coding technique that ensures a low enough level of BER at Bob, while assuring a BER at Eve as close as possible to, for example, 0.5. The information theoretic coding technique may ensure a SNR advantage between Bob and Eve such that Bob has an acceptable reliability error rate, while Eve has a minimum error rate that precludes accurate decoding of the message M.

The exemplary process includes the device obtaining a message (M) for transmission (block 800). The message M may include any type of message used for communicating via the brokered communication protocol implemented by broker 110. For example, the message M may include a publisher or subscriber access request, or a BER/SNR measurement request. The message M may include a block of data having a certain quantity of bits. In one implementation, the message may include a fixed length block of data having a fixed quantity of bits.

The device obtains an interleaving key (K) (block 805). The device may have obtained the interleaving key K at block 640 of FIG. 6 and, therefore, the device can retrieve the interleaving key K from local memory. The interleaving key K may include a random bit sequence that is used as a key for shuffling the arrangement of the bits of the message M.

The device uses the interleaving key (K) as a permutation key to interleave and shuffle portions of the message (M) to create an interleaved message ($M_i$) (block 810). For example, a message M may include equal portions of bits P1, P2, P3, P4, and P5, and the interleaving bit may include a random bit sequence of 10110. In this simplified example, each 1 to 0, or 0 to 1 transition within the random bit sequence causes the corresponding equal portions to be switched with one another. Therefore, the 1 to 0 (10110) transition of the random bit sequence causes P1 to be switched with P2, resulting in P2, P1, P3, P4, P5. The 0 to 1 (10110) of the random bit sequence causes P1 to be switched with P3, resulting in P2, P3, P1, P4, P5. The 1 to 1 (10110) of the random bit sequence means that the bit portions are not switched with one another, resulting in P2, P3, P1, P4, P5. The 1 to 0 (10110) of the random bit sequence causes P4 to be switched with P5, resulting in P2, P3, P1, P5, P4. The resulting shuffled message $M_i$, thus, includes portions P1, P2, P3, P4, P5 shuffled and interleaved with another in the following order: P2, P3, P1, P5, P4. With knowledge of the interleaving key K, the interleaved message $M_i$ may subsequently be un-shuffled and de-interleaved using a reversed implementation of the shuffling process described above. The system diagram of FIG. 9 depicts message M and interleaving key K being input into an interleaver 910, and the interleaver 910 outputting a shuffled, interleaved message $M_i$.

The device obtains a device ID key ($ID_{key}$) (block 815). The device may have obtained the device ID key ($ID_{key}$) at block 640 of FIG. 6 and, therefore, the device can retrieve the device ID key $ID_{key}$ from local memory. The device concatenates the device ID key ($ID_{key}$) to the interleaved message ($M_i$) [$M_i$ $ID_{key}$], or inserts bits of the device ID key ($ID_{key}$) into known bit positions of the interleaved message ($M_i$)(block 820). The system diagram of FIG. 9 depicts the interleaved message $M_i$ and the device ID key $ID_{key}$ being input into multiplexer (MUX) 920, and MUX 920 concatenates the $ID_{key}$ with the interleaved message $M_i$, or inserts the bits of $ID_{key}$ into the known positions of the interleaved message $M_i$, to generate the output [$M_i$ $ID_{key}$]. Thus, the device ID key may be appended as one block of bits to the interleaved message $M_i$, or may be distributed throughout known bit locations of the interleaved message $M_i$ such that the device ID key is spread across the interleaved message, but at known positions from which the device ID key bits may be later retrieved.

The device encodes the concatenated message [$M_i$ $ID_{key}$] with systematic coding [$M_i$ $ID_{key}$]encoded (block 825). The system diagram of FIG. 9 depicts the output from MUX 920 [$M_i$ $ID_{key}$] being input into systematic coder C 930, and coder 930 generating an encoded output [$M_i$ $ID_{key}$]$_{encoded}$. The systematic coder C may include any error-correcting coder in which the input data is embedded in the encoded output such that the information symbols in the encoded output are identically located within the encoded message as within the source message prior to encoding. The systematic coding used for encoding the concatenated message may include, for example, systematic linear coding (e.g., Reed-Solomon coding, low density parity check (LDPC) coding), systematic convolutional coding, and systematic fountain coding. Other types of systematic coding may, however, be used for encoding the concatenated message. Though only a single coder C 930 is depicted in FIG. 9, coder 930 may, in some implementations, include an inner coder for reliability and an outer coder for secrecy.

The device determines parity bits ($P_b$) for the encoded concatenated message [$M_i$ $ID_{key}$]$_{encoded}$ (block 830). The parity bits $P_b$ may be one or more parity bits determined using existing parity check algorithms. The parity bits $P_b$ may be one or more bits added to the encoded output of coder 930 to, for example, create even or odd parity. The system diagram of FIG. 9 depicts the encoded output [$M_i$ $ID_{key}$]$_{encoded}$ from coder 930 being input to parity unit 940, and parity unit 940 generating the one or more parity bits $P_b$ based on the input encoded concatenated message. The device punctures or removes the encoded bits of the device ID key ($ID_{key}$) from the encoded concatenated message (block 835). Since a systematic coder C has been used to encode the concatenated message, the encoded bits of the encoded $ID_{key}$ correspond to the unencoded bits of the $ID_{key}$ within the concatenated message. Therefore, the device can identify the location of the encoded bits of the encoded $ID_{key}$ within the encoded concatenated message, and remove or "puncture" the encoded bits of the encoded $ID_{key}$. The system diagram of FIG. 9 depicts puncturer 950 puncturing the input encoded, concatenated message to remove the encoded bits that correspond to the $ID_{key}$.

The device 105 concatenates the parity bits ($P_b$) to the punctured encoded message [[$M_i$]$_{encoded}$$P_b$], where the strikethrough for the term $ID_{key}$ indicates that the $ID_{key}$ bits have been punctured or removed (block 840). The system diagram of FIG. 9 depicts a MUX 960 receiving the parity bit(s) $P_b$ from parity unit 940, and the punctured, encoded message received from puncturer 950, and MUX 960 concatenating the parity bit(s) to the encoded message to produce an encoded message [[$M_i$]$_{encoded}$$P_b$]. The device transmits the encoded message [[$M_i$]$_{encoded}$$P_b$] (block 845). The device transmits the encoded message to the intended destination device via wireless network(s) 160 and/or network(s) 150.

Figure 10:
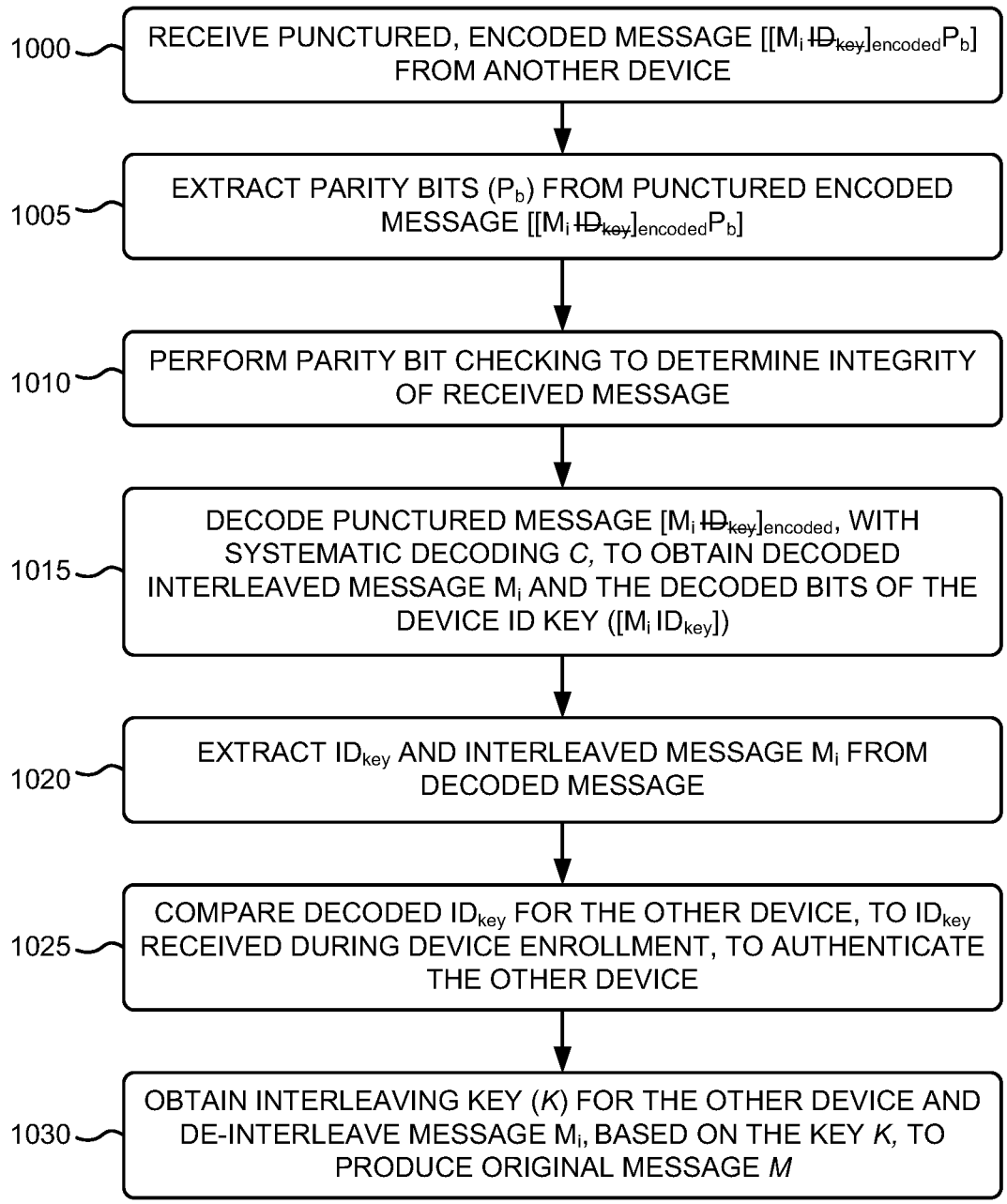
FIG. 10 is a flow diagram that illustrates an exemplary process for receiving, decoding, and authenticating, using a secrecy-preserving information theoretic decoding technique, a message received from another device.

FIG. 10 is a flow diagram that illustrates an exemplary process for receiving, decoding, and authenticating, using a secrecy-preserving information theoretic coding technique, a message received from another device. The exemplary process of FIG. 10 may be implemented by IoT device 105, broker 110, and/or subscriber devices 140 for decoding and authenticating an encoded message received at the IoT device 105, broker 110 and/or subscriber device 140. For example, IoT device 105 may execute the process of FIG. 10 to decode and authenticate a BER/SNR measurement request from broker 110. As a further example, broker 110 may execute the process of FIG. 10 to decode and authenticate sensor data received in a message from an IoT device 105. As another example, a subscriber device 140 may execute the process of FIG. 10 to decode and authenticate a message received from broker 110. The exemplary process of FIG. 10 is described below with reference to the diagram of FIG. 11.

The exemplary process includes the device receiving a punctured, encoded message [[$M_i$]$_{encoded}$$P_b$] from another device (block 1000). For example, broker 110 may receive an encoded message from an IoT device 105, where the message contains sensor data and was encoded and transmitted, via wireless network(s) 160 and network(s) 150, as described with respect to FIGS. 8 and 9 above.

Figure 11:
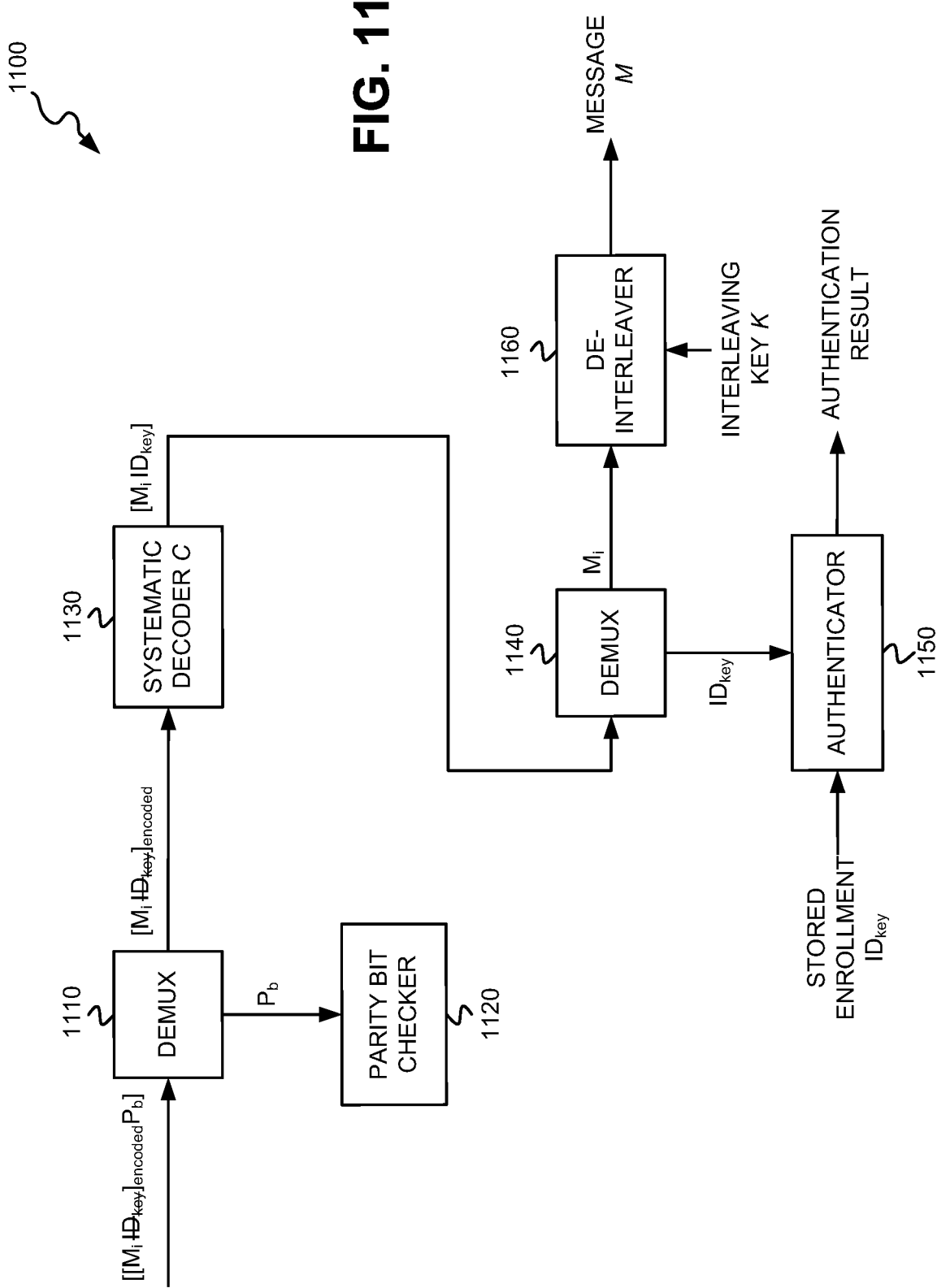
FIG. 11 is a system diagram associated with the exemplary process of FIG. 10.

The device extracts the parity bit(s) ($P_b$) from the punctured, encoded message [[$M_i$]$_{encoded}$$P_b$] (block 1005). The system diagram of FIG. 11 depicts demultiplexer (DEMUX) 1110 receiving the encoded message [[$M_i$]$_{encoded}$$P_b$], and demultiplexing the encoded message to extract the parity bit(s) $P_b$. The device performs a parity bit check, using the extracted parity bits $P_b$, to determine the integrity of the received message (block 1010). The system diagram of FIG. 11 depicts a parity bit checker 1120 receiving the parity bits $P_b$ from DEMUX 1110. Parity bit checker 1120 performs the parity bit check using existing techniques. If the parity bit check determines that there were sufficient bit errors during transmission, the device may request that the encoded message be re-transmitted. The device decodes the punctured message [$M_i$]$_{encoded}$, with systematic decoding C, to obtain the decoded interleaved message $M_i$ and the decoded bits of the device ID key (block 1015). The device ID key $ID_{key}$, even though punctured in block 835 of FIG. 8, may be recovered during the decoding process using inherent error correction properties of the systematic decoding. Since the locations of the punctured bits of the device ID key are known, and assuming the signal-to-noise (SNR) in the received signal is sufficiently high, the systematic decoding may recover the punctured bits during the decoding process as long as the total bit length of the encoded message (which includes the interleaved message $M_i$ and the device ID key) is greater than 2t, where t is the number of bits deleted or punctured from the message (i.e., the punctured bits of the device ID key). Therefore, the length (t), in bits, of the $ID_{key}$ may be selected to have a short enough length, relative to the encoded message, such that the encoded message is greater than twice the length of the $ID_{key}$. The systematic decoder C 1130 may execute a systematic decoding technique that is the counterpart to the systematic encoding technique performed by systematic coder C 930 described above with respect to block 825 and FIG. 8. Though only a single decoder C 1130 is depicted in FIG. 11, decoder 1130, in implementations in which the coder C 930 used to encode the data includes an inner coder and an outer coder, may include an inner decoder and an outer decoder. The system diagram of FIG. 11 depicts systematic decoder C 1130 receiving the encoded, punctured message $[M_i]_{encoded}$ and decoding the message to recover the decoded, interleaved message $M_i$ and the original, decoded bits of the device ID key $ID_{key}$.

The device extracts the device ID key $ID_{key}$ and the interleaved message $M_i$ from the decoded message (block 1020). The system diagram of FIG. 11 depicts DEMUX 1140 receiving the decoded message $[M_i\ ID_{key}]$ and demultiplexing the message to extract the interleaved message $M_i$ and the device ID key $ID_{key}$. As shown, DEMUX 1140 supplies the extracted $ID_{key}$ to authenticator 1150, and the interleaved message $M_i$ to de-interleaver 1160.

The device compares the extracted $ID_{key}$ for the IoT device 105, to the $ID_{key}$ received during IoT device enrollment (and stored in local memory or in DB 120), to authenticate the IoT device 105 (block 1025). As shown in FIG. 11, authenticator 1160 receives the $ID_{key}$ extracted from the decoded message, and retrieves an $ID_{key}$ for the device stored during device enrollment. To retrieve the $ID_{key}$ stored during device enrollment, for example, IoT device DB 120 may be queried with a device ID, from the message header, to locate an entry 300 having a device ID stored in field 305 that matches the device ID from the message header. Once the entry 300 is located in DB 120, a device ID key $ID_{key}$ is retrieved from field 310 of the located entry 300. Authenticator 1160 compares the extracted $ID_{key}$ with the stored enrollment $ID_{key}$ to determine if they match one another. If the two device ID keys match one another, then the device is considered to be authenticated. If the two device ID keys do not match one another, then the device is considered to have failed authentication. If the device fails authentication, the exemplary process stops at block 1025, the interleaved message is discarded, and an authentication failure message may be returned to the device that transmitted the message.

The device obtains the interleaving key (K) for the IoT device 105 and de-interleaves the message $M_i$, based on the key K, to produce the original message M (block 1030). To retrieve the interleaving key K stored during device enrollment, for example, IoT device DB 120 may be queried with a device ID, from the message header, to locate an entry 300 having a device ID stored in field 305 that matches the device ID from the message header. Once the entry 300 is located in DB 120, an interleaving key K is retrieved from field 315 of the located entry 300. FIG. 11 depicts de-interleaver 1160 receiving the interleaved message n, and the interleaving key K, and using the interleaving key K as a permutation key in a process that reverses the shuffling of message M described with respect to block 810 of FIG. 8 above. De-interleaving the interleaved message $M_i$ results in the original message M from block 800 of FIG. 8.

Figure 12A:
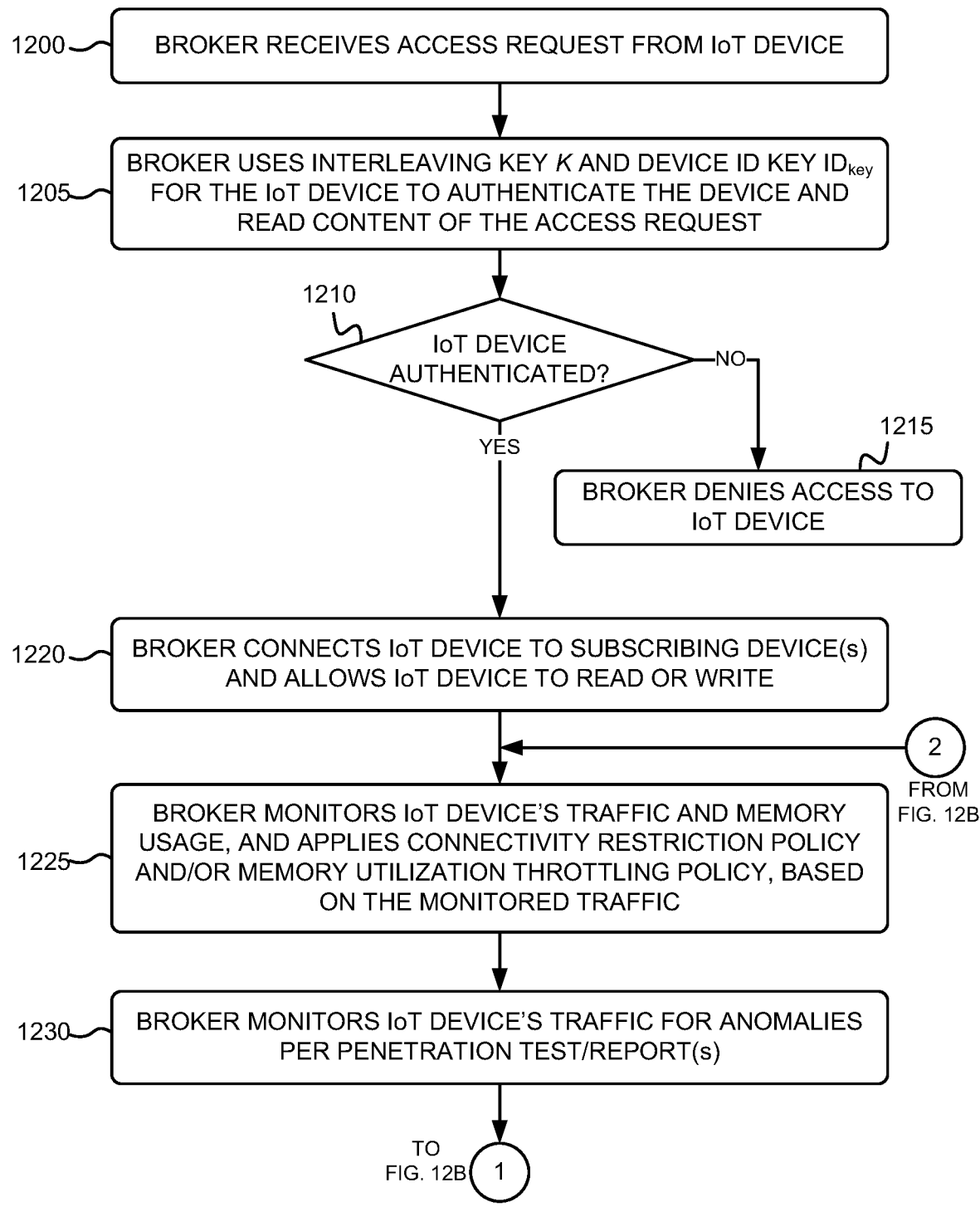

FIGS. 12A and 12B are flow diagrams that illustrate an exemplary process for implementing a brokered communication protocol that grants or denies access to a device based on information theoretic coding techniques, and controls device memory usage and device connectivity based on monitored traffic to and from the device. In some instances, the device requesting access may be a publisher IoT device 105. In other instances, the device requesting access may be a subscriber device 140. The exemplary process of FIGS. 12A and 12B may be implemented by broker 110. The exemplary process of FIGS. 12A and 12B is described below with reference to the messaging/operation diagram of FIG. 13. The exemplary process of FIGS. 12A and 12B is described below as involving an IoT device 105 sending an access request to broker 110. However, the exemplary process of FIGS. 12A and 12B may alternatively involve a subscriber device 140 sending an access request to broker 110.

Figure 13:
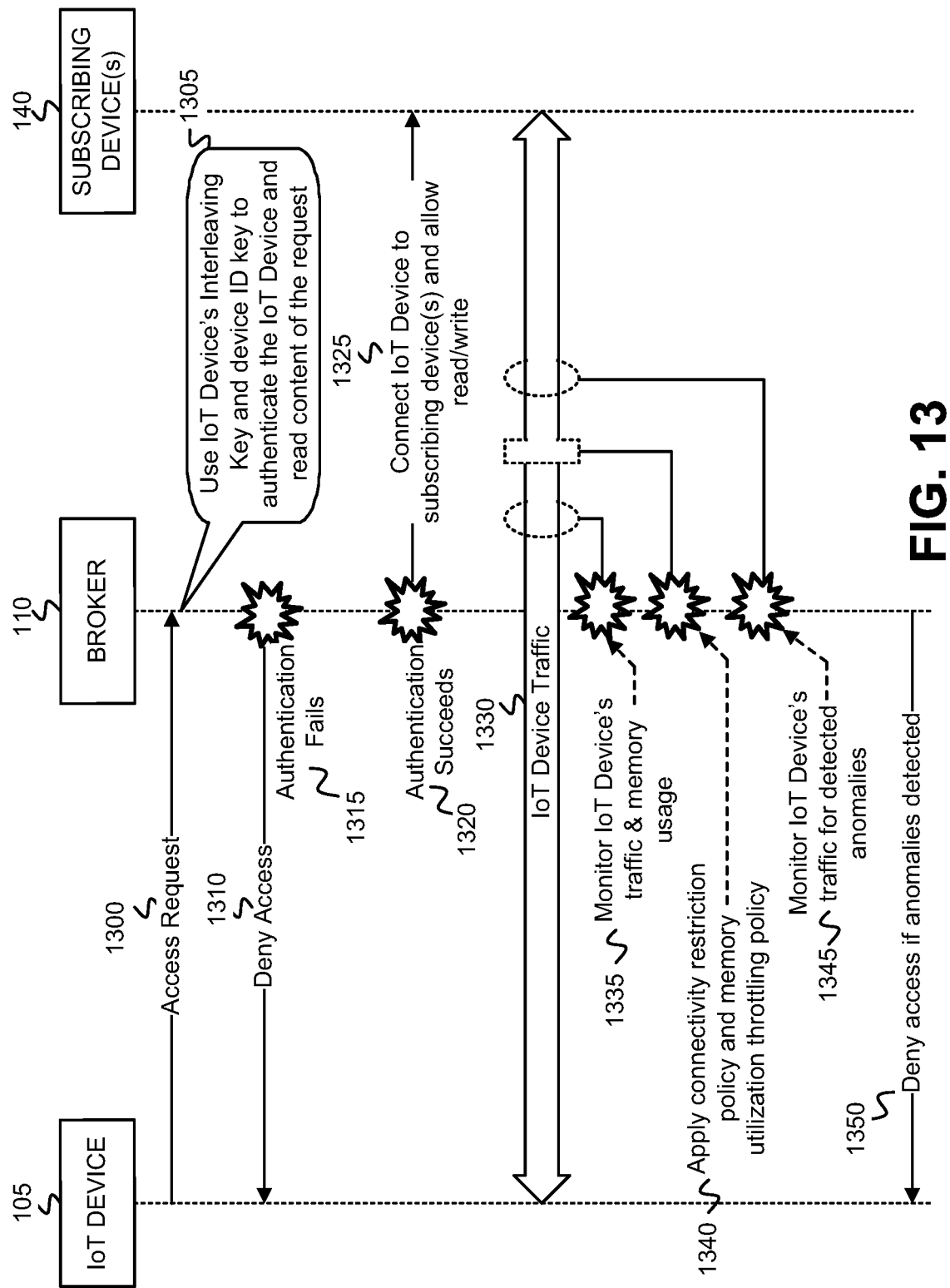
FIG. 13 is a messaging/operation diagram associated with the exemplary process of FIGS. 12A and 12B.

The exemplary process includes broker 110 receiving an access request from an IoT device 105 (block 1200). The IoT device 105 may formulate a request message and transmit the request message to broker 110 via wireless network(s) 160 and network(s) 150 as described with respect to FIGS. 8 and 9 above, and broker 110 may receive the message, decode the message, and authenticate the transmitting IoT device 105 using the contents of the message as described with respect to FIGS. 10 and 11 above. The access request may include a pseudo-name for an IMSI of the IoT device 105, and a destination network address. FIG. 13 depicts broker 110 receiving an access request 1300 from IoT device 105.

Broker 110 uses an interleaving key (K) and a device ID key ($ID_{key}$) for the IoT device 105 to authenticate the device 105 and to read the content of the received request (block 1205). Retrieval and use of the interleaving key K and the device ID key $ID_{key}$ for authentication and reading of the content of the access request message is described with respect to blocks 1020, 1025, and 1030 of FIG. 10 above. FIG. 13 depicts broker 110 using 1305 IoT device 105's interleaving key and device ID key to authenticate the IoT device and to read the content of the access request. Broker 110 determines if the IoT device 105 has been authenticated (block 1210). Authentication of the IoT device 105 includes broker 110 comparing a device ID key $ID_{key}$ retrieved from the decoded access request message, and comparing to the device ID key $ID_{key}$ previously stored in DB 120 by broker 110 at the time of enrollment of the IoT device 105. Broker 110 authenticates the device as described with respect to block 1025 of FIG. 10 above. If the IoT device 105 has not been successfully authenticated (NO—block 1210), then broker 110 denies access to IoT device 105 (block 1215). FIG. 13 depicts authentication failure 1315, and broker 110 sending a message 1310 to IoT device 105 that denies access in response to access request 1300. If the IoT device 105 has been successfully authenticated (YES—block 1210), then broker 110 connects IoT device 105 to a subscriber device(s) 140 and allows the IoT device 105 to read or write (block 1220). FIG. 13 depicts a successful authentication 1320, and broker 110 connecting 1325 IoT device 105 to subscribing device(s) 140 and allowing the reading and/or writing of data based on the successful authentication.

Broker 110 monitors IoT device 105's traffic, and memory usage, and applies a connectivity restriction policy and/or a memory utilization throttling policy based on the monitored traffic (block 1225). FIG. 13 depicts IoT device traffic 1330 occurring between IoT device 105 and subscriber device(s) 140, via broker 110, and broker 110 monitoring 1335 the IoT device 105's traffic and memory usage. Though not shown in FIG. 13, monitoring of the memory usage of IoT device 105 may involve broker 110 sending memory polling requests to IoT device 105 requesting an indication of a current amount of memory in use and/or a current amount of memory available for use. To prevent Botnet attacks, a memory utilization threshold of, for example, 90% may be used to stop traffic to the IoT device 105, or from the IoT device 105, and prevent denial of service attacks that cause memory overflow. FIG. 13 further depicts broker 110 applying 1340 a connectivity restriction policy and a memory utilization throttling policy to IoT device 105 or IoT device 105's traffic based on the monitored traffic and/or memory usage.

Broker 110 monitors the IoT device 105's traffic for anomalies per a penetration test(s)/report(s) (block 1230) and determines if any anomalies have been detected (block 1235). The penetration test(s)/report(s) may indicate various types of anomalies that may occur with the operation of the IoT device 105, or with traffic transmitted from, or to, the IoT device 105. Broker 110 may analyze the traffic for indicated anomalies. Some examples of typical anomalies that may be detected per the penetration test(s)/report(s) include: 1) default passwords that are not changed, 2) a same default WiFi password that is shared across devices, 3) inadequate encryption used to store passwords, 4) extraneous ports, such as ports 22 and 80, that are open to a Wide Area Network interface, 5) the occurrence of Secure Shell (SSH) listening on a port is different than port 22 with no root login, 6) the operating system (OS) not being hardened, 7) the ability to modify device/router settings to run commands as a root, 7) the existence of controls and/or cloud access that are insecure, 8) a device admin web interface that is not encrypted, 9) a device admin web interface that allows a user to exercise arbitrary commands and create a backdoor, and/or 10) Firmware Over the Air (FOTA) updates are not performed securely. FIG. 13 depicts broker 110 monitoring 1345 the traffic of IoT device 105 for detected anomalies.

Broker 110 determines if any anomalies have been detected (block 1235). If any anomalies have been detected (YES—block 1235), then broker 110 denies access to the IoT device 105 (block 1240). FIG. 13 depicts broker 110 denying 1350 access to IoT device 105 if anomalies are detected in the IoT device 105's traffic. If no anomalies have been detected (NO—block 1235), then the exemplary process returns to block 1225 with the continued monitoring of the IoT device 105's traffic.

The exemplary process of FIGS. 12A and 12B may be repeated for each access request received from a device, such as an IoT device 105, at broker 110.

Figure 14:
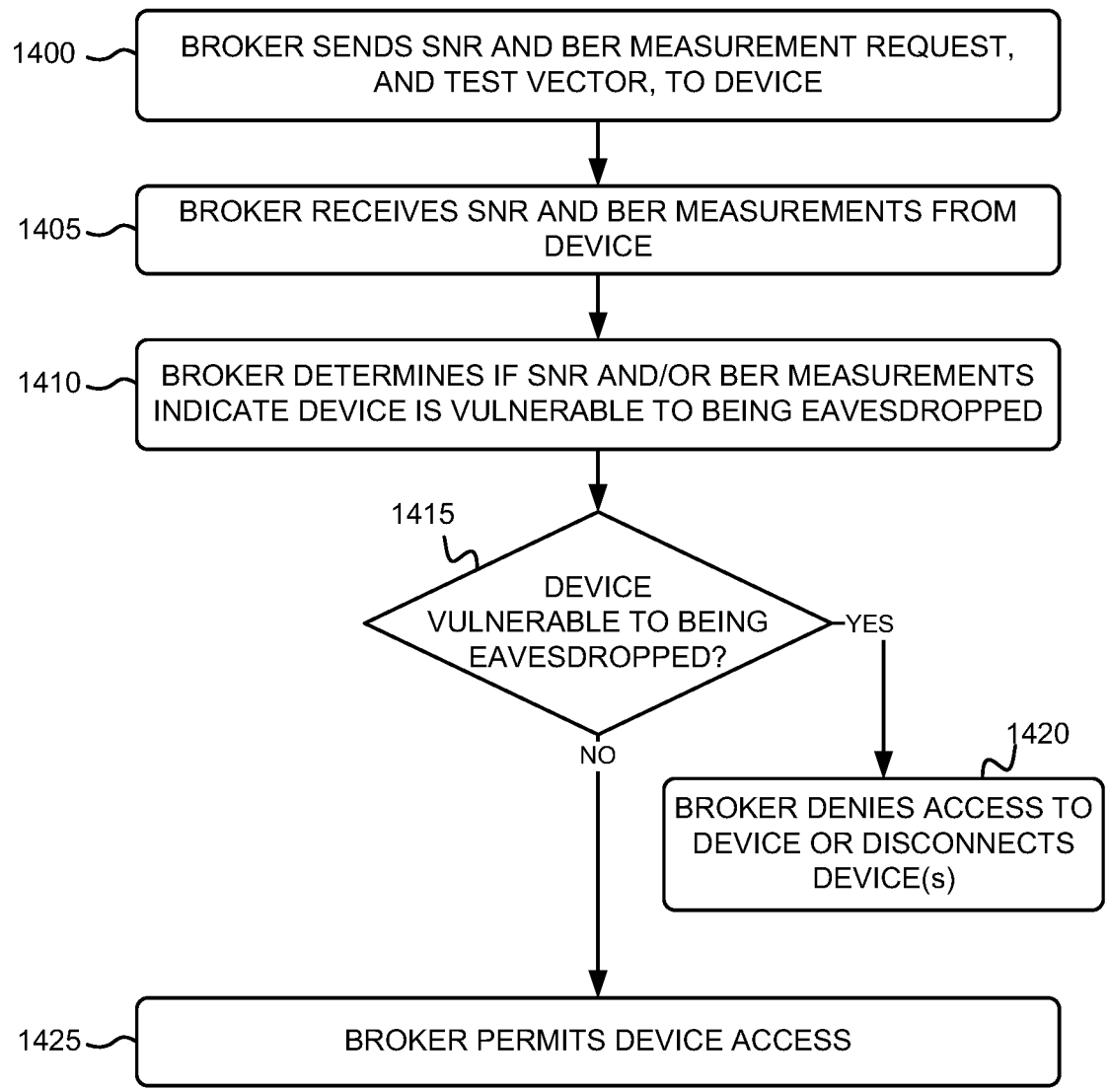
FIG. 14 is a flow diagram that illustrates an exemplary process for auditing bit-error-rate and/or signal-to-noise measurements from an IoT device and granting or denying access to the IoT device based on results of the auditing.

FIG. 14 is a flow diagram that illustrates an exemplary process for auditing BER and/or SNR measurements from an IoT device 105 and granting or denying access to the IoT device 105 based on results of the auditing. The exemplary process of FIG. 14 may be implemented by broker 110. The exemplary process of FIG. 14 is described below with reference to the messaging/operation diagram of FIG. 15. The exemplary process of FIG. 14 may, for example, be performed responsive to receipt of an access request from an IoT device 105 (e.g., block 1200 of FIG. 12). Additionally, the exemplary process of FIG. 14 may be performed periodically (e.g., every three minutes subsequent to IoT device 105 enrollment), or may be performed based on the occurrence of a certain event. Though the process of FIG. 14 is described with respect to auditing BER and/or SNR measurements from IoT devices 105, it may also be executed to audit BER and/or SNR measurements for subscriber devices 140 that, for example, communicate via wireless network(s) 160.

Figure 15:
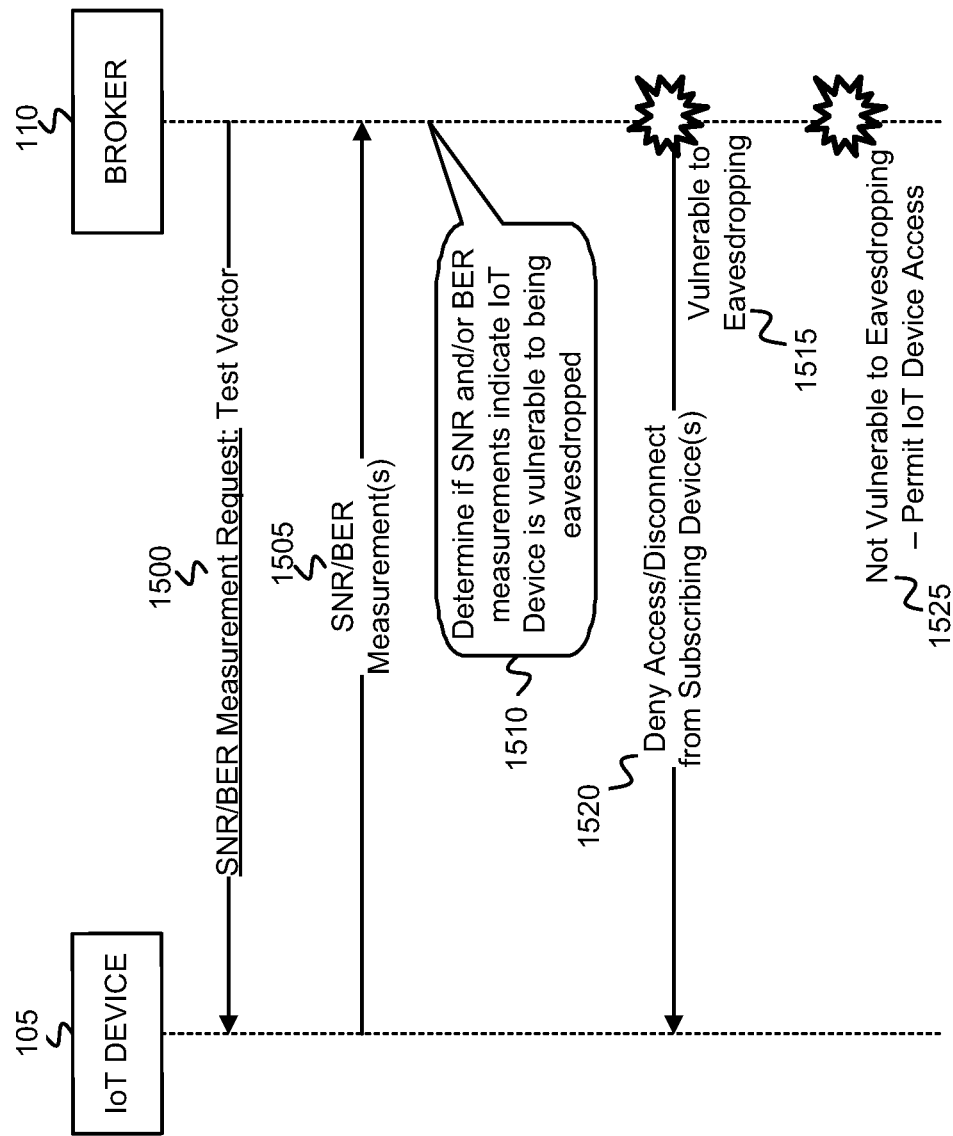
FIG. 15 is a messaging/operation diagram associated with the exemplary process of FIG. 14.

The exemplary process includes broker 110 sending a SNR and BER measurement request and a test vector to an IoT device 105 (block 1400). The message requesting the SNR and/or BER measurements, and including the test vector, may be encoded and transmitted as described with respect to FIGS. 8 and 9 above. FIG. 15 depicts broker 110 sending a SNR/BER measurement request 1500, that includes a test vector, to IoT device 105.

Broker 110 receives SNR and BER measurements from the IoT device 105 (block 1405). The transceiver of IoT device 105 may perform SNR and/or BER measurements, based on the test vector, using existing SNR and BER measurement techniques. For example, to measure the BER, the IoT device 105 may compare the received test vector with a known, stored version of the test vector to determine the number of bit errors in the received test vector. FIG. 15 depicts IoT device 105 sending, responsive to the measurement request 1500, one or more measurement values that may include a measurement of SNR at IoT device 105 and and/or a measurement of BER at IoT device 105.

Broker 110 determines if the SNR and/or BER measurements indicate that IoT device is vulnerable to message interception or eavesdropping by another party or device (block 1410). The secrecy of transmission, using information theoretic coding techniques as described herein, relies on the legitimate receiver having a sufficient BER and/or SNR advantage over a potential eavesdropper to enable accurate decoding at the legitimate receiver, but precluding accurate decoding at the eavesdropper. In terms of BER, the BER of the transmission received at the legitimate receiver should reach a low enough level (e.g., $10^{-5}$), while the BER of the transmission received at the eavesdropper should be as close as possible to 0.5. In terms of SNR, the SNR of the received transmission at the legitimate receiver should at least equal a minimum SNR threshold that achieves an acceptable reliability error rate for accurate decoding, while the SNR of the received transmission at the eavesdropper should equal a maximum SNR threshold at which the eavesdropper operates with a minimum error rate that precludes accurate decoding of the transmitted message. Due to interleaving of the message, as described with respect to FIGS. 8 and 9 above, the puncturing of the device ID key from the decoded message, and selection of an appropriate length device ID key, a known level of degradation in the BER and/or SNR of the transmitted message can be induced such that, if BER and/or SNR measurements at the IoT device 105 are obtained, then a level of BER and/or SNR of the received message at a potential eavesdropper can be predicted such that it can be determined whether the IoT device 105 is vulnerable to being eavesdropped. Eavesdropping vulnerability may be based on a determined Bit Error Cumulative Distribution Function (BE-CDF) that gives the probability of having $t_e$ or less errors as a function of the SNR for a message of size $S_m$, encoded with a code C (or inner code Ci). Eavesdropping vulnerability may additionally, or alternatively, be based on a determined Bit Error Rate Cumulative Distribution Function (BER-CDF) that measures the probability of having a decoder failure that generates a BER close to 0.5 in the estimated message bits $S_b$. Since the legitimate receiver (e.g., the broker 110) knows the device ID key of the IoT device 105, and also knows the interleaving key K, the degradation in the BER and/or SNR of the received message can be eliminated or substantially reduced when the message is decoded at the legitimate receiver. FIG. 15 depicts broker 110 determining 1510 if the SNR and/or BER measurement(s) indicate that the IoT device 105 is vulnerable to being eavesdropped.

If broker 110 determines that IoT device 105 is vulnerable to being eavesdropped by another party or device (YES—block 1415), then broker 110 denies access to the IoT device 105 and disconnects IoT device 105 from any recipient(s) and posting device(s) (block 1420). FIG. 15 depicts broker 110 determining that IoT device 105 is vulnerable 1515 to being eavesdropped, based on the BER and/or SNR measurements, and denying 1520 access to IoT device 105 and/or disconnecting IoT device 105 from a subscriber device. If broker 110 determines that IoT device 105 does not appear to be vulnerable to being eavesdropped by another party or device (NO—block 1415), then broker 110 permits continued access to the IoT device 105 (block 1425). FIG. 15 depicts broker 110 determining that IoT device 105 is not vulnerable 1525 to being eavesdropped, based on the BER and/or SNR measurements, and permitting IoT device access.

The foregoing description of implementations provides illustration and description, but is not intended to be exhaustive or to limit the invention to the precise form disclosed. Modifications and variations are possible in light of the above teachings or may be acquired from practice of the embodiments. For example, while series of blocks have been described with respect to FIGS. 4, 6, 8, 10, 12A-12B, and 14, and message/operation flows with respect to FIGS. 5, 7, 13, and 15, the order of the blocks and/or message flows may be varied in other implementations. Moreover, non-dependent blocks may be performed in parallel. Embodiments have been described herein as focused on securely connecting IoT devices to wireless networks (e.g., Fifth Generation (5G) networks). However, with the advent of ultra-dense 5G cellular networks that are likely to connect heterogeneously with other types of deployed networks, the principles described here may be extended for use in these other types of networks.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a communication brokering device from a first device, a measurement of at least one of a bit-error-rate (BER) or a signal-to-noise ratio (SNR) associated with receipt of a transmission at the first device;
   determining, by the communication brokering device, whether the first device is vulnerable to message interception or eavesdropping based on the measurement of the at least one of the BER or the SNR; and
   controlling, by the communication brokering device, communications between at least one second device and the first device based on the determination of whether the first device is vulnerable to message interception or eavesdropping.

2. The method of claim 1, further comprising:
   transmitting, by the communication brokering device, the transmission to the first device, wherein the transmission includes a message requesting at least one of BER or SNR measurements.

3. The method of claim 2, wherein the transmission further includes a test vector and wherein the measurement of the at least one of a BER or a SNR is performed at the first device based on receipt of the message including the test vector.

4. The method of claim 2, further comprising:
   scrambling, by the communication brokering device, portions of data of the message to be transmitted to produce a scrambled message;
   concatenating a key to the scrambled message; and
   applying systematic coding to the scrambled message to produce an encoded message.

5. The method of claim 4, wherein the key comprises a device identifier key assigned to the first device.

6. The method of claim 4, further comprising:
   determining parity bits based on the encoded message;
   appending the parity bits to the encoded message; and
   puncturing the encoded message, to remove encoded bits that correspond to the key, to produce a punctured encoded message, and
   wherein transmitting the transmission to the first device comprises:
   transmitting the punctured encoded message to the first device.

7. The method of claim 4, further comprising:
   generating a random bit sequence, and
   wherein the scrambling portions of the data of the message to be transmitted further comprises:
   interleaving the portions of the data of the message based on the generated random bit sequence.

8. The method of claim 2, wherein determining whether the first device is vulnerable to message eavesdropping further comprises:
   determining, using a Bit Error Cumulative Distribution Function (BE-CDF), a first probability of having a number $t_e$ of bit errors, or fewer than $t_e$ bit errors, as a function of the SNR associated with receipt of the message at the first device; and predicting eavesdropping vulnerability based on the determined first probability.

9. The method of claim 8, wherein determining whether the first device is vulnerable to message eavesdropping further comprises:

determining, using a Bit Error Rate Cumulative Distribution Function (BER-CDF), a second probability of having a decoder failure that generates a BER close to 0.5 in the estimated message bits of the message received at the first device, wherein predicting eavesdropping vulnerability is further based on the determined second probability.

10. The method of claim 1, wherein controlling the communications between the at least one second device and the first device comprises:

preventing, by the communication brokering device, distribution of messages between the at least one second device and the first device if the first device is determined to be vulnerable to message interception or eavesdropping, or permitting, by the communication brokering device, distribution of messages between the at least one second device and the first device if the first device is determined not be vulnerable to message interception or eavesdropping.

11. A communication brokering device, comprising:
a transceiver connected to a network; and
a processing unit configured to:
receive, via the transceiver from a first device, a measurement of at least one of a bit-error-rate (BER) or a signal-to-noise ratio (SNR) associated with receipt of a transmission at the first device,
determine whether the first device is vulnerable to message interception or eavesdropping based on the measurement of the at least one of the BER or the SNR, and
control communications between at least one second device and the first device based on the determination of whether the first device is vulnerable to message interception or eavesdropping.

12. The communication brokering device of claim 11, wherein the processing unit is further configured to:

transmit, via the transceiver, the transmission to the first device, wherein the transmission includes a message requesting at least one of BER or SNR measurements and a test vector, and wherein the measurement of the at least one of a BER or a SNR is performed at the first device based on receipt of the message including the test vector.

13. The communication brokering device of claim 12, wherein the processing unit is further configured to:

scramble portions of data of the message to be transmitted to produce a scrambled message;
concatenate a key to the scrambled message; and
apply systematic coding to the scrambled message to produce an encoded message.

14. The communication brokering device of claim 13, wherein the key comprises a device identifier key assigned to the first device.

15. The communication brokering of claim 13, wherein the processing unit is further configured to:

determine parity bits based on the encoded message;

append the parity bits to the encoded message; and
puncture the encoded message, to remove encoded bits that correspond to the key, to produce a punctured encoded message, and wherein, when transmitting the transmission to the first device, the processing unit is further configured to:
transmit, via the transceiver, the punctured encoded message to the first device.

16. The communication brokering device of claim 13, wherein the processing unit is further configured to:

generate a random bit sequence, and
wherein, when scrambling portions of the data of the message to be transmitted, the processing unit is further configured to:
interleave the portions of the data of the message based on the generated random bit sequence.

17. The communication brokering device of claim 12, wherein, when determining whether the first device is vulnerable to message eavesdropping, the processing unit is further configured to:

determine, using a Bit Error Cumulative Distribution Function (BE-CDF), a first probability of having a number $t_e$ of bit errors, or fewer than $t_e$ bit errors, as a function of the SNR associated with receipt of the message at the first device; and predict eavesdropping vulnerability based on the determined first probability.

18. The communication brokering device of claim 17, wherein, when determining whether the first device is vulnerable to message eavesdropping, the processing unit is further configured to:

determine, using a Bit Error Rate Cumulative Distribution Function (BER-CDF), a second probability of having a decoder failure that generates a BER close to 0.5 in the estimated message bits of the message received at the first device, wherein predicting eavesdropping vulnerability is further based on the determined second probability.

19. The communication brokering device of claim 11, wherein, when controlling the communications between the at least one second device and the first device, the processing unit is further configured to:

prevent distribution of messages between the at least one second device and the first device if the first device is determined to be vulnerable to message interception or eavesdropping, or permit distribution of messages between the at least one second device and the first device if the first device is determined not be vulnerable to message interception or eavesdropping.

20. A non-transitory storage medium storing instructions executable by a communication brokering device, wherein the instructions comprise instructions to cause the device to:

receive, from a first device, a measurement of at least one of a bit-error-rate (BER) or a signal-to-noise ratio (SNR) associated with receipt of a transmission at the first device;

determine whether the first device is vulnerable to message interception or eavesdropping based on the measurement of the at least one of the BER or the SNR; and control communications between at least one second device and the first device based on the determination of whether the first device is vulnerable to message interception or eavesdropping.

* * * * *